United States Patent
Dhelaria et al.

(10) Patent No.: US 11,711,255 B2
(45) Date of Patent: Jul. 25, 2023

(54) SYSTEMS AND METHODS FOR DATA LINKAGE AND ENTITY RESOLUTION OF CONTINUOUS AND UN-SYNCHRONIZED DATA STREAMS

(71) Applicant: Citrix Systems, Inc., Fort Lauderdale, FL (US)

(72) Inventors: Pakshal Kumar H Dhelaria, Davangere (IN); Ambarish Kumar, Bangalore (IN); Saifulla Shaik, Nellore (IN); Aikaterini Kalou, Patras (GR)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/463,989

(22) Filed: Sep. 1, 2021

(65) Prior Publication Data

US 2023/0055677 A1 Feb. 23, 2023

Related U.S. Application Data

(63) Continuation of application No. PCT/GR2021/000055, filed on Aug. 17, 2021.

(51) Int. Cl.
*G06F 15/173* (2006.01)
*H04L 41/0233* (2022.01)
*H04L 67/562* (2022.01)
*H04L 41/14* (2022.01)

(52) U.S. Cl.
CPC .......... *H04L 41/0233* (2013.01); *H04L 41/14* (2013.01); *H04L 67/562* (2022.05)

(58) Field of Classification Search
CPC ... H04L 67/561; H04L 67/562; H04L 67/563; H04L 41/0233; H04L 41/14; H04L 41/149

USPC ................................ 709/223–224, 231–232
See application file for complete search history.

(56) References Cited

U.S. PATENT DOCUMENTS

| | | | |
|---|---|---|---|
| 6,421,358 B1 * | 7/2002 | Stimmel | H04N 21/488 348/E7.054 |
| 8,291,005 B2 * | 10/2012 | Lang | G06F 9/546 709/231 |
| 8,752,072 B2 * | 6/2014 | Goldstein | G06F 9/542 709/231 |
| 9,275,353 B2 * | 3/2016 | Lu | G06Q 10/04 |
| 11,232,106 B1 * | 1/2022 | Gattu | H04L 41/14 |

(Continued)

OTHER PUBLICATIONS

International Search Report on PCT Appl. No. PCT/GR2021/000055 dated May 11, 2022.

*Primary Examiner* — Bharat Barot

(57) ABSTRACT

The present disclosure is directed to a scalable, extensible, fault-tolerant system for stateful joining of two or more streams that are not fully synchronized, event ordering is not guaranteed, and certain events arrive a bit late. The system can ensure to combine the events or link the data in near real-time with low latency to mitigate impacts on downstream applications, such as ML models for determining suspicious behavior. Apart from combining events, the system can ensure to propagate the needed entities to other product streams or help in entity resolution. If any of the needed data is yet to arrive, a user can configure a few parameters to achieve desired eventual and attribute consistency. The architecture is designed to be agnostic of stream processing framework and can work well with both streaming and batch paths.

20 Claims, 10 Drawing Sheets

(56) References Cited

U.S. PATENT DOCUMENTS

| | | | |
|---|---|---|---|
| 11,558,446 B2* | 1/2023 | Pippin | H04L 67/565 |
| 2008/0301124 A1 | 12/2008 | Alves et al. | |
| 2018/0322170 A1* | 11/2018 | Alberton | G06F 16/24568 |
| 2018/0357266 A1* | 12/2018 | Zenger | G06F 16/2358 |
| 2019/0258733 A1* | 8/2019 | Brown | G06F 16/2456 |
| 2020/0034468 A1* | 1/2020 | Lei | G06F 16/2456 |
| 2020/0287847 A1* | 9/2020 | Ota | H04L 47/30 |
| 2022/0035533 A1* | 2/2022 | Danilov | G06F 3/0659 |

* cited by examiner

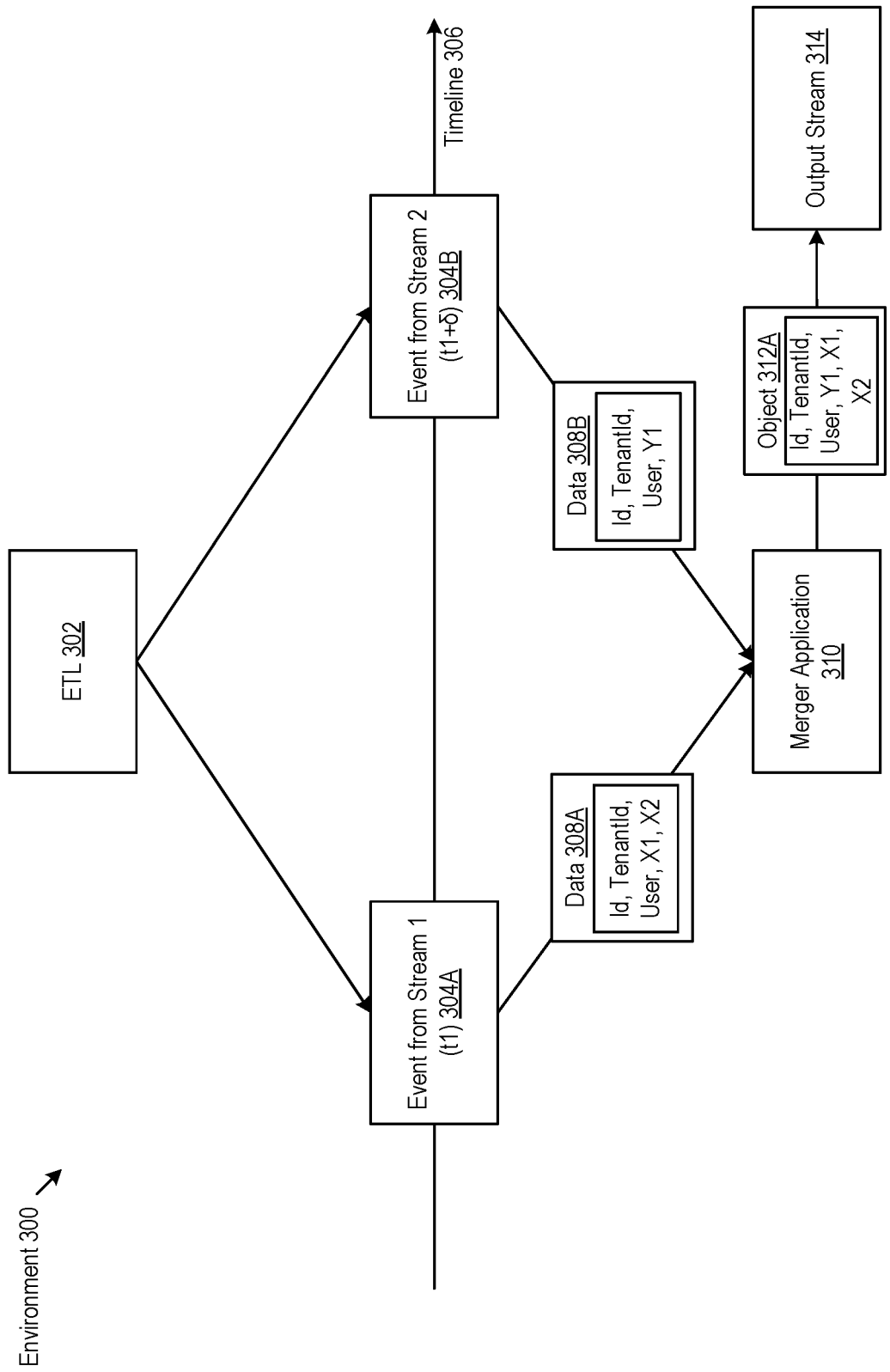

SYSTEMS AND METHODS FOR DATA LINKAGE AND ENTITY RESOLUTION OF CONTINUOUS AND UN-SYNCHRONIZED DATA STREAMS

CROSS-REFERENCE TO RELATED APPLICATION

This application is a continuation of and claims priority to and the benefit of International Patent Application No. PCT/GR2021/000055, titled "SYSTEMS AND METHODS FOR DATA LINKAGE AND ENTITY RESOLUTION OF CONTINUOUS AND UN-SYNCHRONIZED DATA STREAMS," and filed on Aug. 17, 2021, the contents of all of which are hereby incorporated herein by reference in its entirety for all purposes.

FIELD OF THE DISCLOSURE

The present disclosure generally relates to computers and networking systems. In particular, the present disclosure relates to systems and methods for data linkage and entity resolution of continuous and un-synchronized data streams.

BACKGROUND

Networks can include products, datacenters, and applications that exchange data in streams with various attributes, but analyzing the various attributes across different streams is difficult.

BRIEF SUMMARY

Cloud-based services (e.g., CITRIX ANALYTICS SERVICE (CAS)) can provide analytical insights of the data across network products and externally integrated products. The cloud-based services can collate data from various sources and provide visibility into user and application behavior. The data can be used to build a dashboard to provide a complete view of network activity or a complete view of a user. The data collected can be used to proactively determine any security threats present in the environment and provide analytical insights to the network administrator.

The data can include information from various entities like users, devices, applications, networks, and shares, as well as their correlation over time from various products. The data can be analyzed by various user-defined models and machine learning algorithms to detect any unusual or suspicious activity in the network or system. These models may need or rely on such data in real-time so that security vulnerabilities can be detected quickly and preventive measures or actions taken on the end-user or other network entity to prevent anomalous network events from occurring.

Since the data comes from various products within an internal or external environment, there may be a need to combine the information or streams arriving from different products to determine interactions of a user with different devices, applications, networks, and shares over time. The information from various entities can be merged using a common identifier. The interactions help in learning the user behavior patterns over a period of time Using the user behavior patterns, machine learning algorithms can determine any abnormal behavior in the network environment and detect security threats in near real-time.

The data pipeline can include multiple event sources and each one of them can produce high volumes of continuous data. The data produced can either be due to user interaction with various entities in the system or due to system processing. By way of this disclosure, events produced from different sources can be correlated using common identifiers in near real-time to produce a final stream of data with low latency, high data quality, and consistency.

In some cases, entities can be missing in one stream, but arrive as part of other streams. In such cases, the system can perform entity resolution on the data fetched from these other streams and added to the current stream.

The present disclosure provides systems and methods for a scalable, extensible, fault-tolerant approach for stateful joining of two or more streams that are not fully synchronized, event ordering is not guaranteed, or in which certain events arrive late. The system is configured to combine the events or link the data in near real-time with low latency so that there is no impact on the downstream applications, such as machine learning models using the data to determine the suspicious behavior. Apart from combining events, the system can propagate the needed entities to other product streams or assist in entity resolution. If any of the needed data has not arrived or is expected to arrive late or out of order, then the system described herein can provide for the configuration of certain parameters based on use cases to achieve eventual and attribute consistency. The architecture can be designed in a way such that the architecture can be agnostic of stream processing frameworks. The architecture can be implemented on products such as Spark Streaming, Apache Flink, or Kafka streams. The architecture can work well with both streaming and batch paths.

The systems and methods described herein can combine data arriving on two or more streams that have asynchronous events, out of order events, or events that fail to arrive. Certain systems and methods may address the challenge of handling data arriving at different times by using batch processing or using a slow data lake storage. However, such systems may be unable to merge the data for use cases in which near real-time synchronized data from multiple data sources is needed, preferred or desired. The present disclosure describe systems and methods that implement a horizontally scalable and fault tolerant application architecture that combines different streams in streaming fashion to control worst-case end to end or e2e latency. This approach can allow network analytic services to merge data across an increasing number of data sources while generating combined events in near real-time with tunable resolution accuracy tradeoff.

At least one aspect of this disclosure is directed to a method. The method includes creating, by the one or more processors, responsive to processing a first event from a first stream, an object including first data from the first event for merging the first data with second data from a second event of a second stream. The method includes routing, by the one or more processors, the first event to a retry stream to reprocess the first event responsive to determining that the object does not include the second data from the second event and a number of times the first event has been routed to the retry stream does not satisfy a threshold. The method includes transmitting, by the one or more processors, the first data and the second data included in the object responsive to processing the second event to update the object to include the second data. The method includes transmitting, by the one or more processors, the first data included in the object responsive to determining that the object does not include the second data from the second event and the number of times the first event has been routed to the retry stream satisfies the threshold.

In some embodiments, the method further includes subscribing, by the one or more processors, to the first stream, the second stream, and the retry stream. In some embodiments, the method further includes determining, by the one or more processors, that the object does not include the second data and the number of times the first event has been routed to the retry stream does not satisfy the threshold. The method can further include updating, by the one or more processors, a count indicating the number of times the first event has been routed to the retry stream. Routing the first event can include passing, by the one or more processors, the first event to a message broker corresponding to the retry stream.

In some embodiments, creating the object includes identifying, by the one or more processors, one or more attributes from the first event. Creating the object further includes storing, by the one or more processors, as the first data, the one or more attributes in the object. In certain embodiments, creating the object for the first event includes creating the object for the first event responsive to determining that an identifier of the first event does not match an identifier of any object stored by the one or more processors.

In some embodiments, the method further includes receiving, by the one or more processors, the second event from the second stream. The method can further include determining, by the one or more processors, an identifier from the second event. The method can further include determining, by the one or more processors, that the identifier from the second event matches an identifier of the object. The method can further include storing, by the one or more processors, as the second data, one or more attributes from the second event in the object. In certain embodiments, the method further includes dropping, by the one or more processors, the first event responsive to transmitting either the first data stored in the object or the first data and the second data stored in the object.

In some embodiments, the method further includes assigning a flag to the object indicating that the data is to be transmitted responsive to determining that the object does not include the second data and the number of times the first event has been routed to the retry stream satisfies the threshold. In some embodiments, the method further includes assigning a flag to the object indicating that the data is to be transmitted responsive to determining that the object includes the second data. In some embodiments, the method can further include generating, by the one or more processors, responsive to determining that the object includes the second data, a third event comprising one or more attributes from the first event and the second event, and wherein transmitting the data comprises transmitting the third event. The method can further include generating, by the one or more processors, responsive to determining that the object does not include the second data and the number of times the first event was routed to the retry stream satisfies the threshold, a fourth event comprising one or more attributes from the first event. Transmitting the data included in the object can include transmitting the third event or the fourth event. In some embodiments, the method further includes updating, by the one or more processors, responsive to creating the object including the first data of the first event, the object with a first flag indicating that the first event from the first stream has been received. The method can further include updating, by the one or more processors, responsive to updating the object to include the second data of the second event, the object with a second flag indicating that the second event from the second stream has been received.

Another aspect of this disclosure is directed to a system. The system includes one or more processors. The one or more processors are configured to create, responsive to receiving a first event from a first stream, an object including first data from the first event for merging the first data with second data from a second event of a second stream. The one or more processors are configured to route the first event to a retry stream to reprocess the first event responsive to determining that the object does not include the second data from the second event and a number of times the first event has been routed to the retry stream does not satisfy a threshold. The one or more processors are configured to transmit the first data and the second data included in the object responsive to processing the second event to update the object to include the second data. The one or more processors are configured to transmit the first data included in the object responsive to determining that the object does not include the second data from the second event and the number of times the first event has been routed to the retry stream satisfies the threshold.

In some embodiments, the one or more processors are further configured to determine that the object does not include the second data and the number of times the first event has been routed to the retry stream does not satisfy the threshold. The one or more processors can further be configured to update a count indicating the number of times the first event has been routed to the retry stream. To route the first event, the one or more processors can further be configured to pass the first event to a message broker corresponding to the retry stream. In some embodiments, to create the object, the one or more processors can further be configured to identify one or more attributes from the first event. The one or more processors can further be configured to store, as the first data, the one or more attributes in the object. In some embodiments, to create the object for the first event, the one or more processors can further be configured to create the object for the first event responsive to determining that an identifier of the first event does not match an identifier of any object stored by the one or more processors.

In some embodiments, the one or more processors are further configured to receive the second event from the second stream. The one or more processors can further be configured to determine an identifier from the second event. The one or more processors can further be configured to determine that the identifier from the second event matches an identifier of the object. The one or more processors can further be configured to store, as the second data, one or more attributes from the second event in the object. In certain embodiments, the one or more processors are further configured to drop the first event responsive to transmitting either the first data stored in the object or the first data and the second data stored in the object.

In some embodiments, the one or more processors are further configured to assign a flag to the object indicating that the data included in the object is to be transmitted responsive to determining that the object does not include the second data and the number of times the first event has been routed to the retry stream satisfies the threshold. In some embodiments, the one or more processors are further configured to assign a flag to the object indicating that the data included in the object is to be transmitted responsive to determining that the object includes the second data. In some embodiments, the one or more processors are further configured to generate, responsive to determining that the object includes the second data, a third event comprising one or more attributes from the first event and the second event, and wherein transmitting the data comprises transmitting the third event. The one or more processors can further be configured to generate, responsive to determining that the object does not include the second data and the number of times the first event was routed to the retry stream satisfies the threshold, a fourth event comprising one or more attributes from the first event. To transmit the data included in the object, the one or more processors can further be configured to transmit the third event or the fourth event. In some embodiments, the one or more processors are further configured to update, responsive to creating the object using attributes of the first event, the object with a first flag indicating that the first event from the first stream has been received. The one or more processors can further be configured to update, responsive to updating the object using attributes of the second event, the object with a second flag indicating that the second event from the retry stream has been received.

Yet another aspect of this disclosure is directed to a non-transitory computer-readable medium storing instructions that, when executed by one or more processors, cause the one or more processors to create, responsive to receiving a first event from a first stream, an object including first data from the first event for merging the first data with second data from a second event of a second stream. The computer-readable medium further stores instructions that cause the one or more processors to route the first event to a retry stream to reprocess the first event responsive to determining that the object does not include the second data from the second event and a number of times the first event has been routed to the retry stream does not satisfy a threshold. The computer-readable medium further stores instructions that cause the one or more processors to transmit i) the first data and the second data included in the object responsive to processing the second event to update the object to include the second data; or ii) the first data included in the object responsive to determining that the object does not include the second data from the second event and the number of times the first event has been routed to the retry stream satisfies the threshold.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 3A is a block diagram of an environment for handling events from streams, in accordance with one or more embodiments;

Figure 1A:
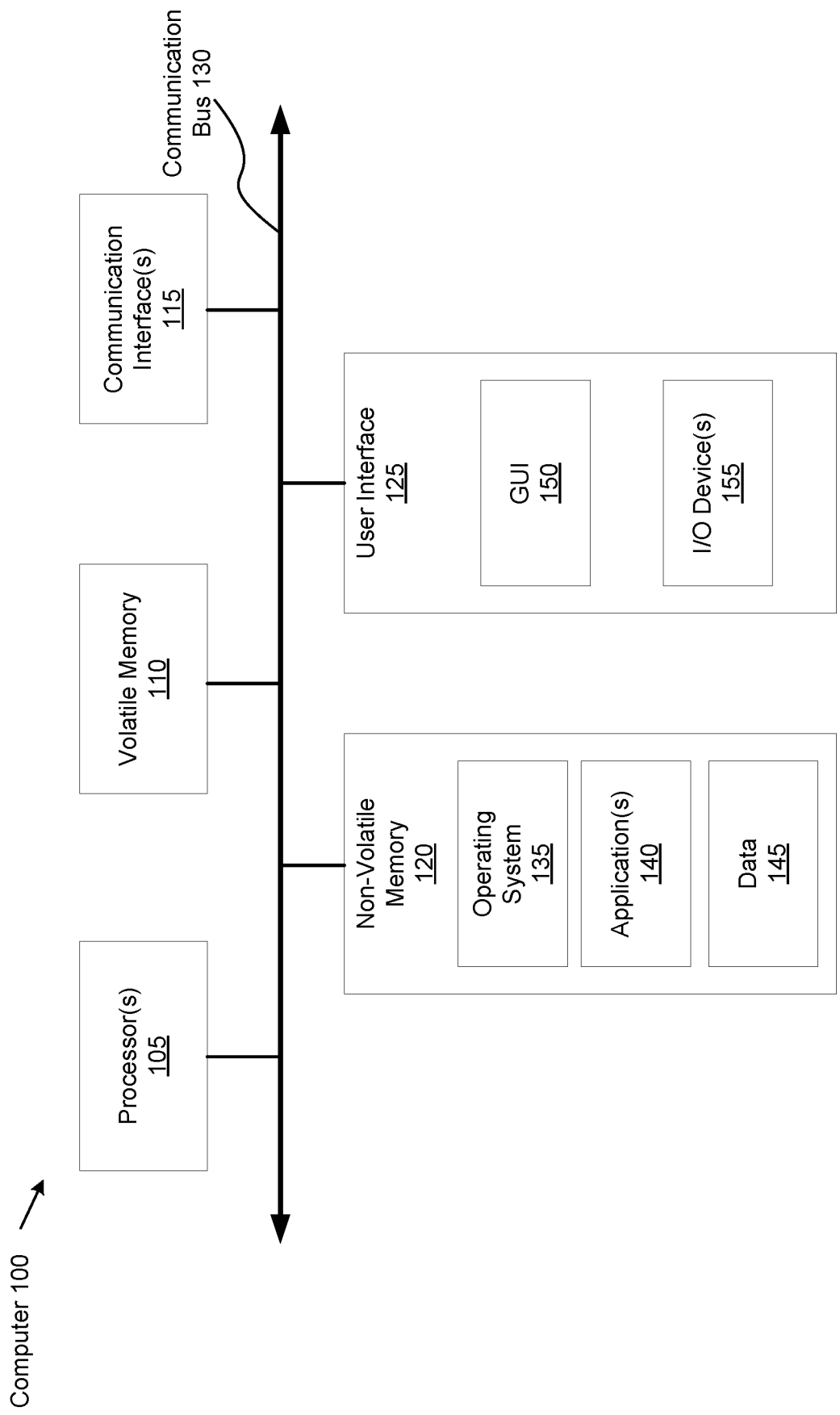
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

One approach for joining continuous streams can include using an intercommunication process to combine events from two or more sources. Another approach is to merge telemetry and log events. This approach might use a delta table or leverage the capability of stream-stream joins such those that APACHE SPARK provides for joining streams. However, this approach would fail to utilize any retry mechanisms. Without the retry mechanisms, the latency can be too high to be able to emit the derived event in the shortest possible time.

Yet another approach is for handling late-arriving events by relying on batch processing or backed data lake storage. This approach can use a reconciliation pattern, a data store to store retry events, and a batch-streaming path for retrying the events. However, the latency of the derived event can get too high and managing multiple streams is difficult. For example, by using KAFKA as storage and the retry mechanism using the streaming path, the applications described herein can maintain low latency. With KAFKA as a storage, the messages can be removed as soon as they are read. The applications can avoid overhead of periodically cleaning up retry data. The applications can store attributes in state, rather than any data store, to retrieve the attributes from state.

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds;

Section C describes load balancing of network traffic;

Section D describes systems and methods for routing remote application data; and Section E describes various example embodiments of the systems and methods described herein.

A. COMPUTING ENVIRONMENT

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital, or mixed-signal. In some embodiments, the "processor" may be one or more physical processors or one or more "virtual" (e.g., remotely located or "cloud") processors. A processor including multiple processor cores and/or multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computer 100 may execute an application on behalf of a user of a client-computing device. For example, the computer 100 may execute a virtual machine, which provides an execution session within which applications execute on behalf of a user or a client-computing device, such as a hosted desktop session. The computer 100 may also execute a terminal services session to provide a hosted desktop environment. The computer 100 may provide access to a computing environment including one or more of: one or more applications, one or more desktop applications, and one or more desktop sessions in which one or more applications may execute.

Figure 1B:
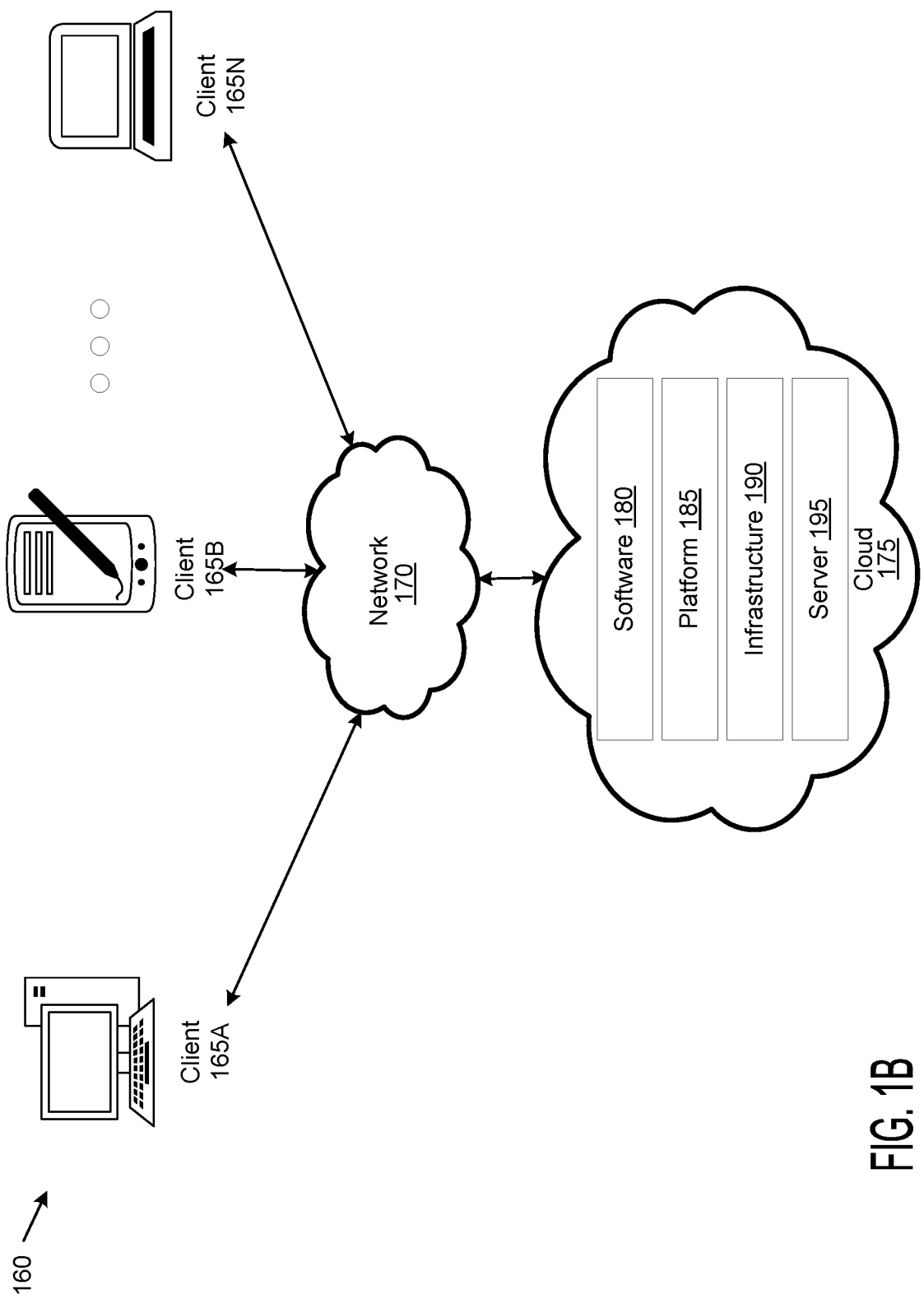
FIG. 1B is a block diagram depicting a computing environment comprising a client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms (e.g., servers 195, storage, and server farms or data centers). The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms (e.g., servers 195, storage, and server farms or data centers). For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control, and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud-based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time. IaaS providers may offer storage, networking, servers, or virtualization resources from large pools, allowing the users to scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g., DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources using web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. RESOURCE MANAGEMENT SERVICES FOR MANAGING AND STREAMLINING ACCESS BY CLIENTS TO RESOURCE FEEDS

Figure 2A:
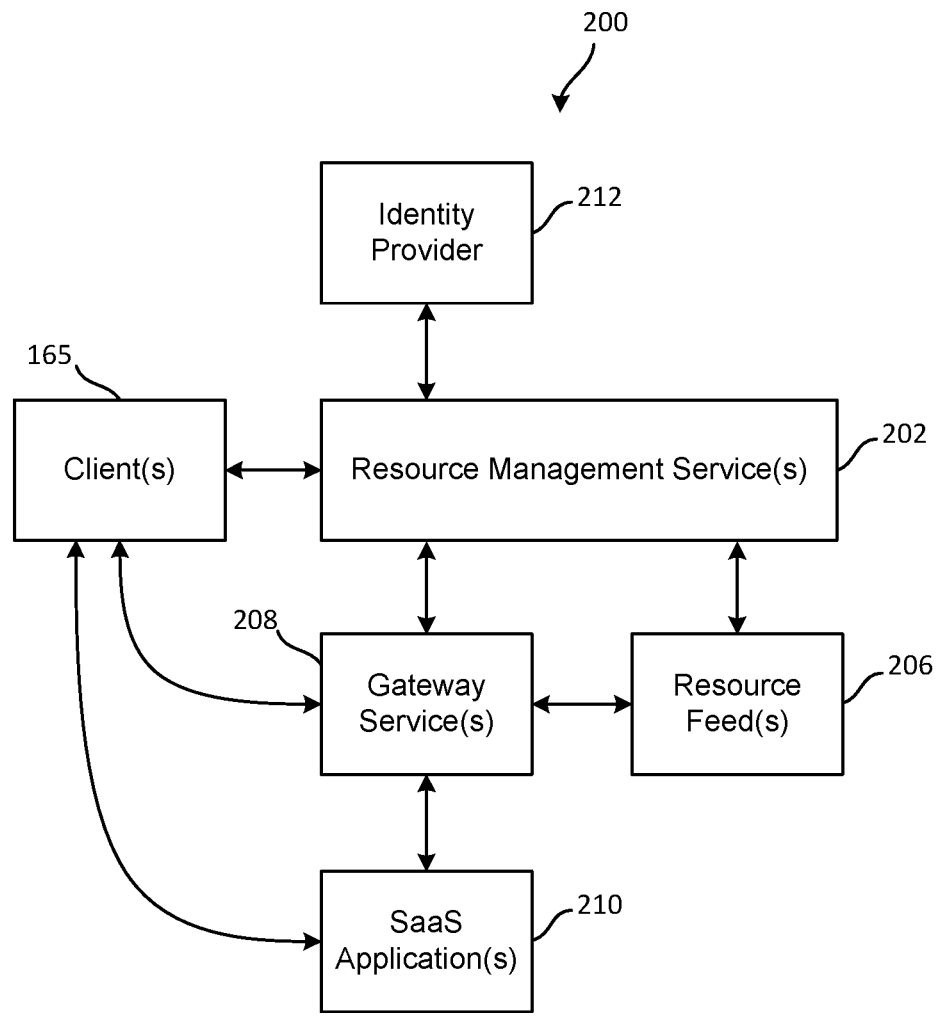
FIG. 2A is a block diagram of an example system in which resource management services may manage and streamline access by clients to resource feeds (via one or more gateway services) and/or software-as-a-service (SaaS) applications.

FIG. 2A is a block diagram of an example system 200 in which one or more resource management services 202 may manage and streamline access by one or more clients 165 to one or more resource feeds 206 (via one or more gateway services 208) and/or one or more SaaS applications 210. In particular, the resource management service(s) 202 may employ an identity provider 212 to authenticate the identity of either end-users, which use a client 165, or the appliances themselves. Following authentication, the resource management service(s) 202 can identify one of more resources for which the user has authorization to access. For example, the resource management service(s) can identify that client 165A has authorization to access the resource feed related to DNS multipath routing whereas client 165B does not (e.g., client 165B is not licensed for a feature; client 165B is not multipath-capable, etc.). In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, and network appliances such as routers and firewalls. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, and one or more internet enabled devices or sensors, etc. Each of the resource management service(s)

202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
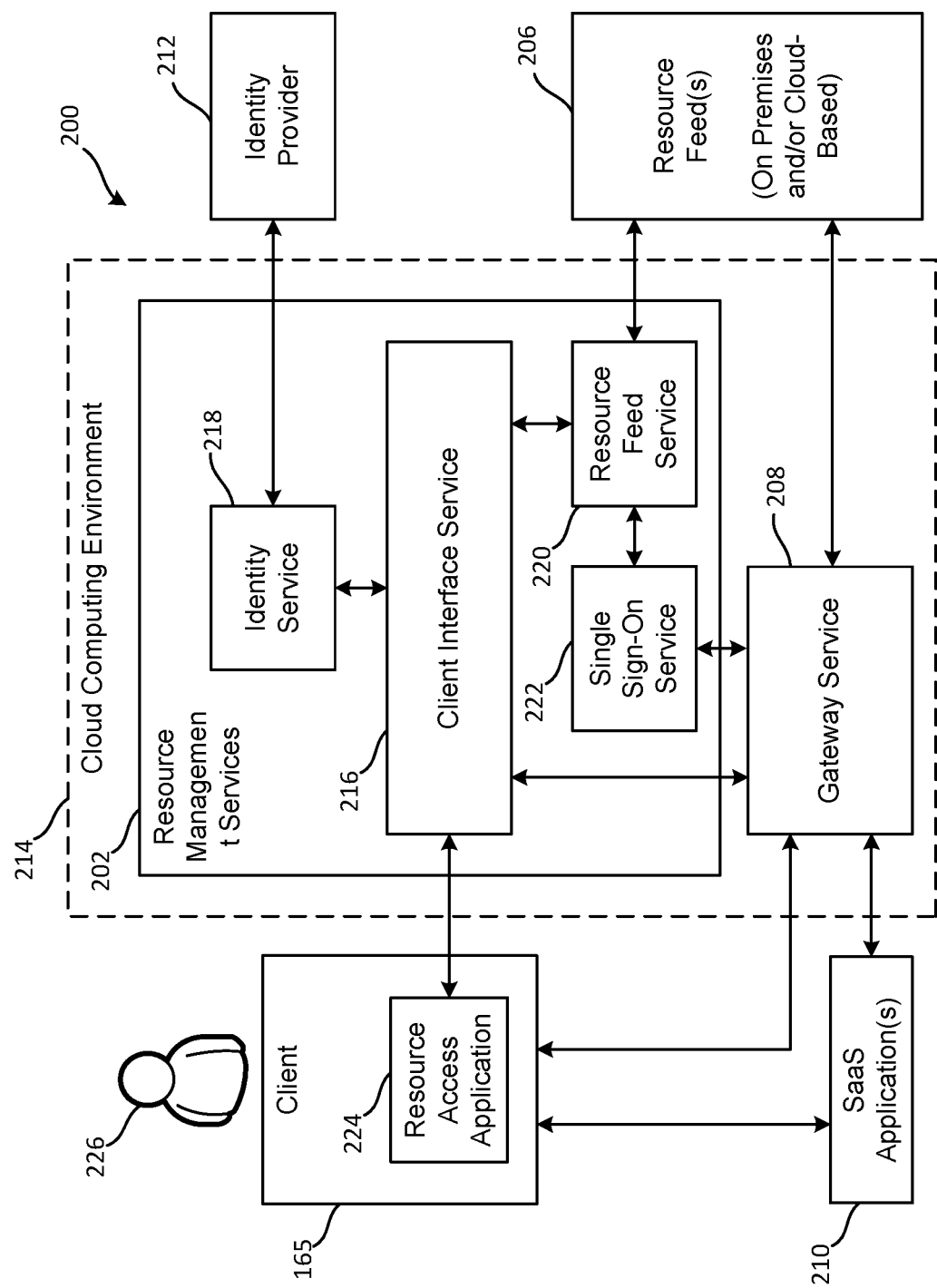
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud-computing environment may include, for example, MICROSOFT AZURE Cloud, AMAZON Web Services, GOOGLE Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, execute on WINDOWS Server instances hosted in resource locations, and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data deployed across multiple locations for geo-redundancy.

When the resource access application 224 is launched or otherwise accessed by a respective client 165, the client interface service 216 may send a sign-on request to the identity service 218. In some embodiments, the identity provider 212 may be located on the premises of the organization for which the system 200 is deployed. The identity provider 212 may, for example, correspond to an on-premise WINDOWS Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a MICROSOFT AZURE Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For the configured resource feeds, the resource feed service 220 may request an identity token from the single sign-on service 222. The resource feed service 220 may then pass the feed-specific identity tokens it receives to the points of authentication for the respective resource feeds 206. The resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 165, and/or one or more SaaS applications 210 to which the user 226 has subscribed). The lists of local applications and the SaaS applications 210 may, for example, are supplied by resource feeds 206 for respective services that manage which such applications are to be made available to the user 226 via the resource access application 224. Examples of SaaS applications 210 that may be managed and accessed as described herein, include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 to request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for the identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource access application 224 is located remotely) (e.g., via a secure browser service). In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access (e.g., by disabling cut/copy/paste operations between the application and the clipboard), (3) restricting printing (e.g., by disabling the ability to print from within the browser), (4) restricting navigation (e.g., by disabling the next and/or back browser buttons), (5) restricting downloads (e.g., by disabling the ability to download from within the SaaS application), and (6) displaying watermarks (e.g., by overlaying a screen-based watermark showing the username and IP address associated with the client 165 such that the watermark will appear as displayed on the screen if the user tries to print or take a screenshot). Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface—without needing to switch context from one resource to another. Further, event notifications in a resource activity feed may be accompanied by a discrete set of user-interface elements (e.g., "approve," "deny," and "see more detail" buttons), allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
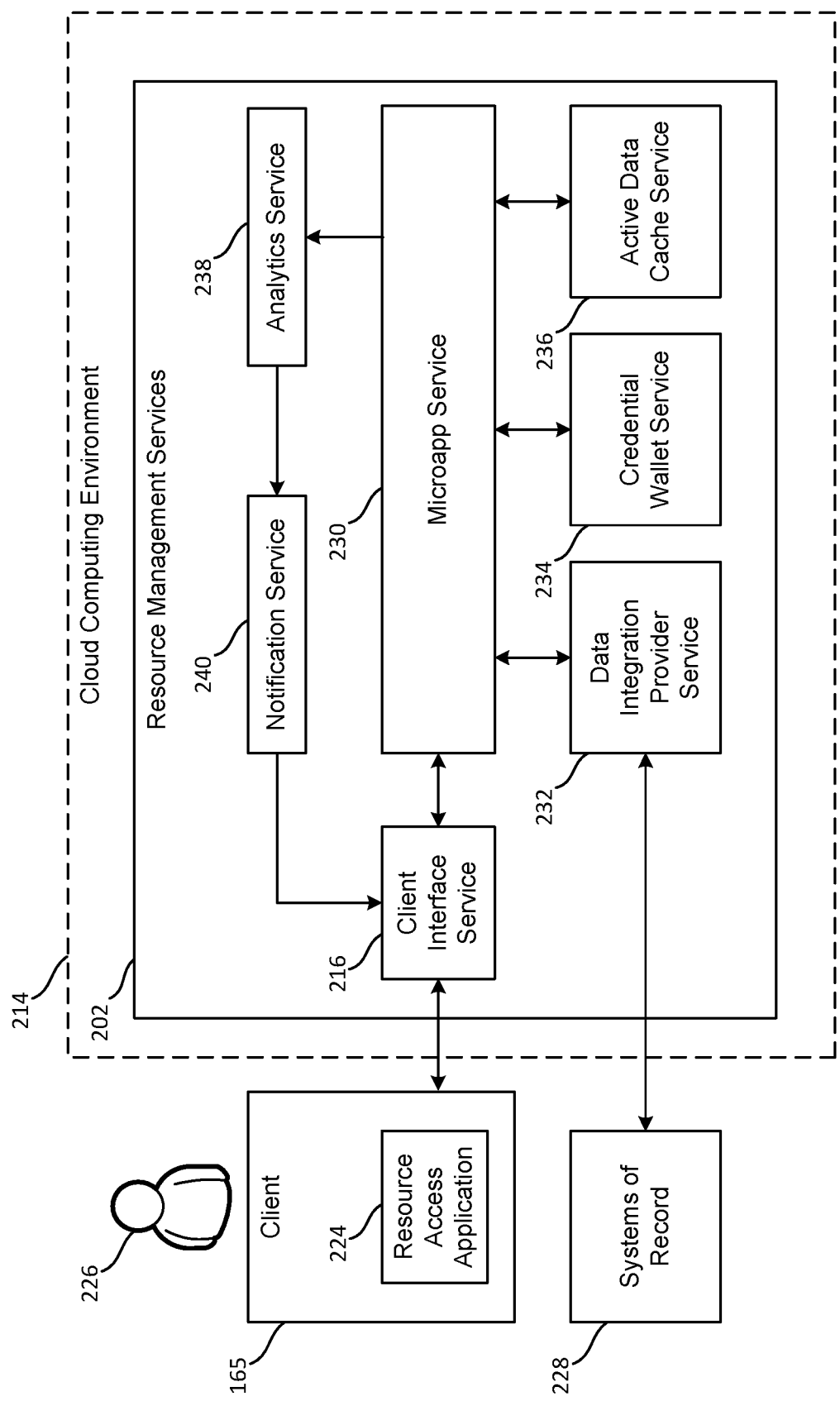
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud-computing environment 214, thus giving administrators a powerful tool to create more productive workflows, without the need for additional infrastructure. Whether pushed to a user or initiated by a user, microapps may provide shortcuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapp service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted OAuth2 token for the system of record for which the action is to be invoked, and may send the action to the data integration provider service 232 together with the encrypted OAuth2 token. The data integration provider service 232 may then decrypt the OAuth2 token and write the action to the appropriate system of record under the identity of the user 226. The data integration provider service 232 may then read back changed data from the written-to system of record and send that changed data to the microapp service 230. The microapp service 230 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may be used, for example, to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back end. In some embodiments, users may be able to interact with the virtual assistance functionality either through the resource access application 224 or directly from another resource, such as Microsoft Teams. This feature may allow employees to work efficiently, stay organized, and deliver only the specific information they are looking for.

C. SYSTEMS AND METHODS FOR DATA LINKAGE AND ENTITY RESOLUTION OF CONTINUOUS AND UN-SYNCHRONIZED DATA STREAMS

Various entities (e.g., products and enterprise solutions) can derive telemetry data of events in an enterprise environment. For example, the events can be sessions, interactions with SaaS applications, or website launch activity. The events may reflect a common activity such as activities across the enterprise environment. For example, different events can relate to serving content items to a client device. One event can relate to requesting the content items from a content server, another event can relate to selecting the content items by a selection server, and yet another event can relate to streaming the content items to the client device by a streaming server. However, if each of the different events arrive at different times from different entities, it is difficult to identify that the events relate to a common activity to view the events in context. Therefore, there is a desire to link these events to combine certain categories of activities to build a unified and enriched view of network activity. The systems and methods described herein can identify that events are linked (e.g., relate to providing content items) regardless of whether the events arrive asynchronously, out of order, or at different times. The systems and methods described herein can merge the events into a common set of attributes that describe the common network activity, and then provide the common set of attributes to downstream applications (e.g., monitoring applications), which can use the common set of attributes to gain insightful analytics relating to the activity. For example, the downstream applications can identify analytics to analyze how some events (e.g., selecting and streaming of content items) relate or cause other events (e.g., viewing or dismissing the content item). In yet another example, a network administrator can merge information arriving from both a remote workspace product and a monitoring product to create a final derived output combining information from both the products.

Referring now to FIG. 3A, depicted is a block diagram of an environment 300 for handling events from streams, in accordance with one or more embodiments. Components described in FIGS. 1A, 1B, and 2A-C, detailed above can perform the operations and functionalities of the environment 300. As shown in FIG. 3A, the environment 300 includes an ETL 302, event 304A and event 304B (generally referred to as events 304), a timeline 306, data 308A and data 308B (generally referred to as data 308), a merger application 310, an object 312, and an output stream 314.

As shown in FIG. 3A, there is a stream of events coming in from different products. A first event from a first stream is received at time t1 and includes information relating to a first tenant, user and a first identifier. A second event from a second stream is received at a later time t1+δ for the same tenant, user and identifier. The merger application 310, as described herein, is configured to merge the two events to create a final output which includes event related data from both the first stream and the second stream.

Under environment 300, the ETL 302 can be configured to receive, process, or identify data from one or more sources. The ETL 302 can be an extract, transform, and load (ETL) service configured to receive data 308 from products that derive telemetry data (in an event format) indicative of user activity, endpoints, apps, notifications, and infrastructure for various activities.

The events 304 can be any computer or network activity occurring in any product or application. The events 304 can be a type of network activity such as a user login, a launch of a virtual application or desktop, a launch of a SaaS application or website, a file download or upload, or an interaction with a dashboard or newsfeed. For example, the events 304 can correspond to updating a client device. Each of the events 304 can correspond to a portion of the update such as the client device requesting the update, authorizing the update, and streaming the update to the client device.

Table 1 depicts example categories of events 304 that are generated by various product (e.g., products 402 as described below) sources. In some scenarios, there is co-existence of at least two data sources for the same user activity. The data linkage is not always mandatory on a streaming path, and it can be sufficient even on a batch path. The implementation mode can depend on the nature and parameters of downstream applications of such event streams.

TABLE 1

Types of events associated with various products

| ID | Type of Event | Type of Products | Example Product (Data sources) |
|---|---|---|---|
| 1 | User Login | -Single sign on (SSO) -Authenticators for access to remote information and applications | 1. Identity service for example, CITRIX IDENTITY PLATFORM 2. Workspace application for example. CITRIX WORKSPACE APP (CWA) |
| 2 | Virtual Apps & Desktops Launch | -Virtual applications and service providers -Trouble-shooters and monitors -On-screen recorders | 1. Workspace application for example, CITRIX WORKSPACE APP (CWA) 2. Monitoring or troubleshooting console/service, for example, CITRIX DIRECTOR/ MONITOR 3. SESSION RECORDING SERVICE |
| 3 | SaaS App & Web Sites Launch | -Virtual internet browsers -SaaS applications | 1. WORKSPACE APP (CWA) 2. SECURE WORKSPACE ACCESS SERVICE |
| 4 | File Download/ Upload | -Database synchronizers -Cloud providers | 1. WORKSPACE APP (CWA) 2. CONTENT COLLABORATION SERVICE |
| 5 | Interaction with Intelligent Smart Feed | -Workflow managers and personalizers | 1. WORKSPACE APP (CWA) 2. MICROAPPS SERVICE |

The events 304 can occur on a timeline 306. On the timeline 306, event 304A can occur or be received at an initial time, t1, and event 304B can occur or be received at a later time, t1+δ. For example, event 304A can correspond to requesting the update and event 304B can correspond to authorizing the update. In another example, the events 304 can relate to user sessions, user logon information, logon time breakdowns, or connection failures for virtual applications and desktops. The events can include telemetry reflecting the actual end-user behavior over the several, available sources (SaaS app, Virtual Apps and Desktops, Microapps, etc.) within a network environment.

The events 304 can include data 308 that describe the activities occurring during the events 304. The data 308 can include client identifiers, tenant identifiers, or any other attributes. The data 308 can include information from various entities like users, devices, applications, networks, and shares. Data 308A can include attributes that describe the event 304A and data 308B can include attributes that describe the event 304B. For example, data 308A can identify the update and the client device requesting the update, and data 308B can identify the update and the authorization of the update.

The merger application 310 can merge the events 304 and their data 308. For example, the event 304A and event 304B can both relate to the updating of the client device. The data 308A and data 308B can include overlapping data, such as the identifier of the client device or update version. The merger application 310 can use the overlapping data of the data 308 to identify that the events 304 are related. The merger application 310 can be a stateful streaming application that subscribes to events 304 from multiple streams, performs state (e.g., storage) management, and generates derived events.

The merger application 310 can merge events 304 that are related in an object 312A (generally referred to as objects 312 or state). The object 312A can include data 308 from each of the events 304. For example, the object 312A can include data 308A to describe the request of the update and data 308B to describe the authorization of the update.

The merger application 310 can transmit the data 308 included in the object 312A to an output stream 314, which is a pathway to downstream applications. For example, the output stream 314 can connect the object to facilitate the transmission of data 308 included in the object 312A to network analytics applications or internet service providers (ISPs). The output stream 314 can be a portal, a network provider, or a data repository.

Figure 3B:
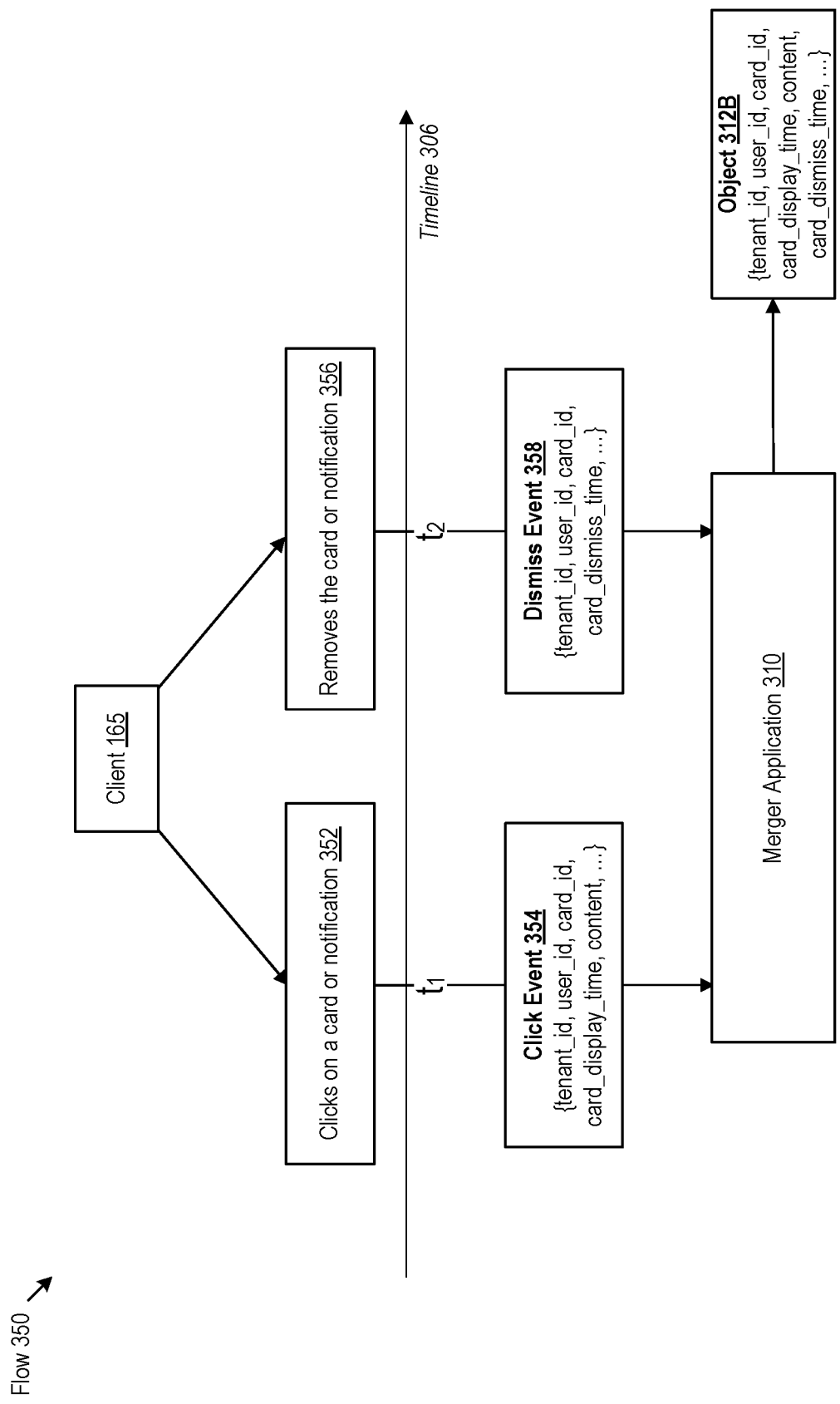
FIG. 3B is a diagram of a flow for capturing user activity in user events, in accordance with one or more embodiments.

Referring now to FIG. 3B, depicted is a diagram of a flow 350 for capturing user activity in user events, in accordance with one or more embodiments. Components described in FIGS. 1A, 1B, and 2A-C, detailed above can perform the operations and functionalities of the flow 350. FIG. 3B illustrates the client 165, the timeline 306, the merger application 310, a click event 354, a dismiss event 358, and an object 312B.

Under flow 350, one example case of data linkage and entity resolution based on Table 1 above includes usage scenarios of INTELLIGENT FEED, available on WORKSPACE INTELLIGENCE (WSI). After user login, the INTELLIGENT FEED can be loaded with recent and relevant notifications for end-user consumption. The end-user can click on one of the cards or notifications to view its content in more detail. After checking the content of the selected card, the end-user can remove or dismiss the particular card from their personal feed to clear up the feed. The present disclosure can link the aforementioned events corresponding to user activities with the cards and notifications in the INTELLIGENT FEED to derive a merged event.

Under flow 350, the client 165 can click on a card or notification (STEP 352). For example, a user can use the client 165 to click on the card or notification in a workspace environment. The client 165 can click at a first time, such as t1, on the timeline 306. For example, the end-user can click on one of the cards or notifications to view its content in more detail. The merger application 310 can receive a click event 354. The click event 354 can include a tenant identifier, a user identifier, a card display time, a content identifier, or any other data 308.

The client 165 can remove the card or notification (STEP 356). The client 165 can remove the card or notification in the workspace environment. For example, after checking the content of the selected card, the client 165 can decide to remove or dismiss the particular card from the feed. The removal can be click at a second time, such as t2, on the timeline 306. The merger application 310 can receive a dismiss event 358. The dismiss event 358 can include a tenant identifier, a user identifier, a card dismiss time, or any other data 308.

The merger application 310 can combine the click event 354 and the dismiss event 358 into the object 312B. The object 312B can include data from both the click event 354 and the dismiss event 358, such as the tenant identifier, the user identifier, the card display time, the content identifier, the card dismiss time, or any other data 308. Accordingly, the merger application 310 can link data from different events occurring at different times into the object 312B to gain analytical insights across different events.

Figure 4:
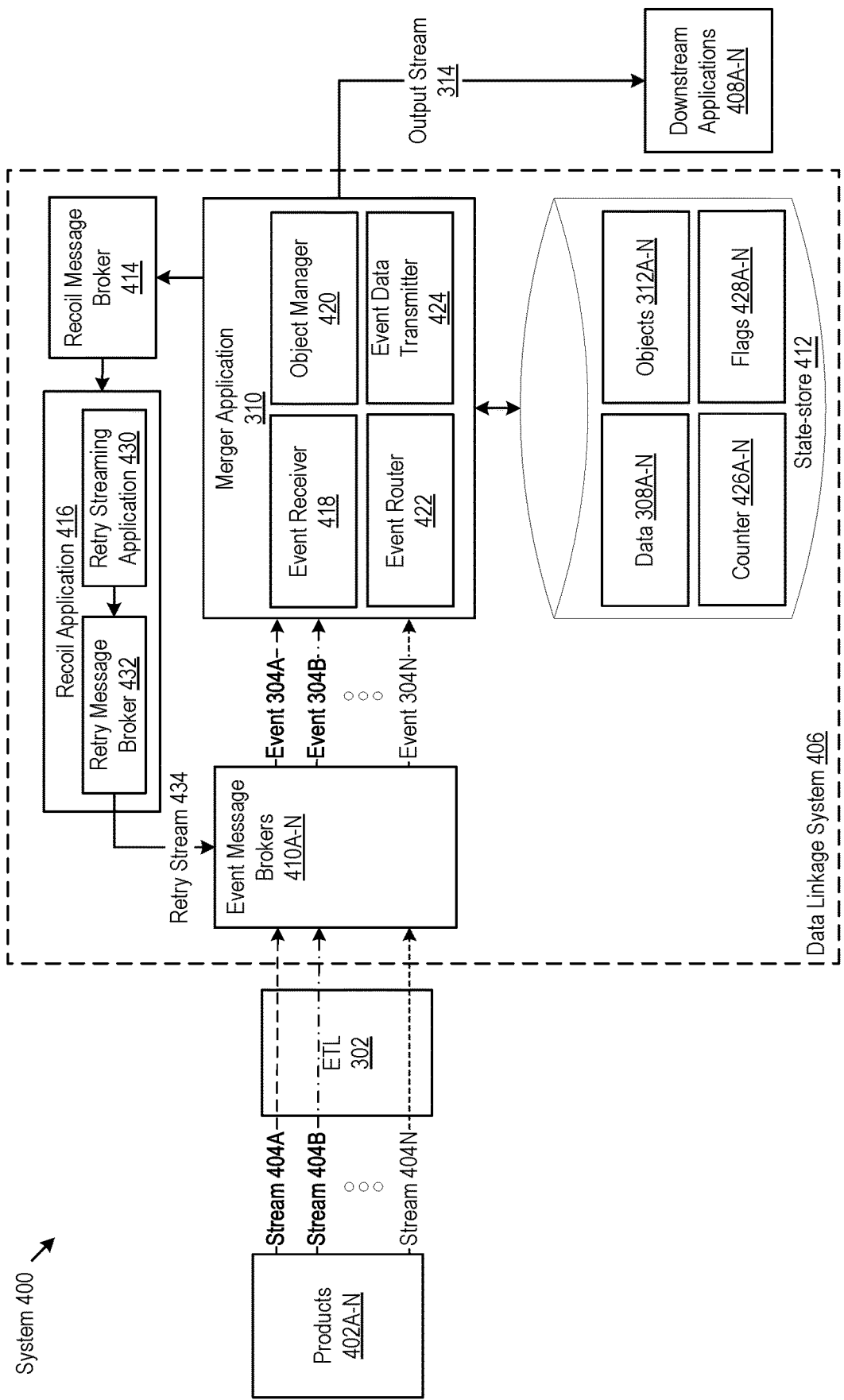
FIG. 4 is a block diagram of a system for data linkage and entity resolution of continuous and un-synchronized data streams, in accordance with one or more embodiments.

Referring now to FIG. 4, FIG. 4 is a block diagram of an environment 400 for data linkage and entity resolution of continuous and un-synchronized data streams, in accordance with one or more embodiments. In brief overview, the environment 400 can include the ETL 302, objects 312, the output stream 314, one or more products 402A-402N (generally referred to as products 402), streams 404A-404N (generally referred to as streams 404), a data linkage system 406, and downstream applications 408A-408N (generally referred to as downstream applications 408). The products 402 can communicatively couple to the ETL 302. The output stream 314 can communicatively couple to the downstream applications 408. The data linkage system 406 can include the events 304, the merger application 310, event message brokers 410A-410N (generally referred to as event message brokers 410), a state-store 412, a recoil message broker 414, and a recoil application 416.

The ETL 302 can be communicatively coupled to the event message brokers 410, which can communicatively couple to the merger application 310, which can be communicatively coupled to the output stream 314, the state-store 412, the recoil message broker 414, and the recoil application 416. The merger application 310 can include an event receiver 418, an object manager 420, an event router 422, and an event data transmitter 424. The state-store 412 can include data 308A-308N (generally referred to as data 308), objects 312A-312N (generally referred to as objects 312), counters 426A-N (generally referred to as counters 426), and flags 428A-N (generally referred to as flags 428). The recoil application 416 can include a retry streaming application 430 and a retry message broker 432 that transmits a retry stream 434.

As described in greater detail below, the merger application 310 can be configured to receive events 304 from event message brokers 410. The merger application 310 can be configured to match the events 304 from multiple streams 404. The merger application 310 can be configured to create objects 312 and match associated events 304 and include their data 308 in the objects 312. The merger application 310 can be configured to route events 304 that have yet to be merged with other events 304 (e.g., those other events 304 are delayed) to the recoil message broker 414. After all the associated events 304 arrive and are merged into the object 312, or after rerouting the events 304 too many times, the merger application 310 can be configured to transmit the data 308 included in the objects 312 to via the output stream 314 to the downstream applications 408.

The ETL 302, the output stream 314, the data linkage system 406 (including the merger application 310 (including the event receiver 418, the object manager 420, the event router 422, and the event data transmitter 424), the event message brokers 410, the state-store 412, the recoil message broker 414, the recoil application 416) and the downstream applications 408 can be implemented using components described in connection with FIGS. 1A, 1B, and 2A-C. In some embodiments, the products 402 may include, correspond to, or be the resource feed 206, the resource feed service 220, or any combination thereof, among others. In some embodiments, the data linkage system 406 includes, corresponds to, or is the analytics service 238.

Each of the above-mentioned elements or entities is implemented in hardware, or a combination of hardware and software, in one or more embodiments. Each component of the data linkage system 406 can be implemented using hardware or a combination of hardware or software detailed above in connection with FIGS. 1A, 1B, and 2A-2C. Each of these elements or entities can include any application, program, library, script, task, service, process or any type and form of executable instructions executing on hardware of the various components in the data linkage system 406 (e.g., the merger application 310 (including the event receiver 418, the object manager 420, the event router 422, and the event data transmitter 424), the event message brokers 410, the state-store 412, the recoil message broker 414, and the recoil application 416). The hardware includes circuitry such as one or more processors in one or more embodiments.

The products 402 can include services or resources utilized as part of an enterprise platform. The products 402 maintain, host, include, provision, or otherwise communicate with devices connected to the enterprise platform. The products 402 can generate events 304 or events 304 can be generated via the products 402. The products 402 can be configured to produce events 304 at different times and include various attributes intended for different purposes. The products 402 can be part of a cloud-computing environment. The products 402 can also be micro-apps, virtual-assistant (VA), web applications, files, virtual Windows applications, virtual Linux applications, desktops, mobile applications, local applications, and other data. The products 402 can include software or firmware designed to provide a specific computing resource or service. The products 402 can be configured to communicate with the ETL 302 via networking technologies such as LTE, WiMAX, DSL, cable, or MPLS.

The streams 404 (also known as topics) can be data pathways or streams of events 304 from the products 402. The streams 404 can be configured as data pipelines that include multiple events 304. The streams 404 can be asynchronous, out of order, or include events 304 arriving at different times. For example, the stream 404A can include events 304A relating to content items being served on webpages and stream 404B can include events 304B relating to interactions with the served content items. The streams 404 can include data 308 of the events 304 that occurred. For instance, in the context of serving content items as discussed above with FIG. 3A, the streams 404 can include data 308 relating to which content items were selected by which server and which content items were interacted with by which client 165. Events 304 of the streams 404 can be produced or generated at different times and include various attributes intended for different purposes.

The data linkage system 406 can be a network administration device, a software defined wide-area network device, an intermediary device, or other hardware, which is configured to facilitate establishing of connections between the products 402 and downstream applications 408. As shown in FIG. 4, the data linkage system 406 can include the merger application 310, the event message brokers 410, the state-store 412, the recoil message broker 414, and the recoil application 416. In some embodiments, a network administrator can manage the data linkage system 406. The data linkage system 406 can be configured to communicate with the ETL 302 and the downstream applications 408.

The downstream applications 408 can be applications, services, servers, computers, or related systems, devices, or components configured to process, store, network, manage, or distribute data for one or more resources. The downstream applications 408 can include or be executed on hardware such as computer nodes, server racks, and the like. The downstream applications 408 can be pre-configured to monitor the products 402. The downstream applications 408 can include one or more devices to control access to products 402.

In some embodiments, the downstream applications 408 can be applications configured to provide analytical insights for an enterprise solution. For example, the downstream applications 408 can identify security threats relating to the products 402. To identify the security threat, the downstream applications 408 can analyze the events 304 from the products 402 to detect unusual or suspicious activity in a network and generate alerts. In another example, the downstream applications 408 can be configured to identify user activities in the network. The downstream applications 408 can be configured to provide analytical insights for products 402 that are part of the network or externally integrated. The downstream applications 408 can be configured to analyze the data 308 by using various user-defined models and machine learning algorithms to detect any unusual or suspicious activity in the network. The downstream applications 408 can be configured to analyze the data in real-time to detect security issues. The downstream applications 408 can be configured to recommend preventative measures or actions to prevent anomalous network events from occurring. The downstream applications 408 can be configured to generate a dashboard to provide information about network activity in the network. The downstream applications 408 can be configured to present the dashboards to a network administrator to indicate information, security threats, or any other analytical insights.

The event message brokers 410 can be configured to consume or receive streams 404 or the retry stream 434. The event message brokers 410 can be configured to consume or receive the streams 404 from the ETL 302. The event message brokers 410 can be configured to also consume or receive one or more retry streams 434 from the retry message broker 432. Each of the event message brokers 410 can be configured to consume or receive one or more events 304 from respective streams 404 and the retry stream 434. The event message brokers 410 can be configured to subscribe to the streams 404 or the retry stream 434. Each of the event message brokers 410 can be configured to correspond to each product 402, so each stream 404 from each product 402 can arrive at a corresponding event message broker 410.

The event message brokers 410 can be configured to identify events 304 in the streams 404. The event message brokers 410 can be configured to identify the events 304 arriving from the ETL 302. For example, the ETL 302 can be configured to extract or transform events 304 from the streams 404, and load or transmit the events 304 to the event message brokers 410. Upon receipt or identification of the events 304 of the streams 404 or the retry stream 434, the event message brokers 410 can be configured to propagate, transmit, or otherwise provide the events 304 to the merger application 310.

In an example, a first event message broker 410A can be configured to receive stream 404A from product 402A and a second event message broker 410B can be configured to receive stream 404B from product 402B. The event message brokers 410 can be configured to receive the stream 404A and the stream 404B from the ETL 302. The event message brokers 410 can receive events 304 of the streams 404 in a micro-batch or with a delay between them. In some embodiments, the streams 404 can be configured to communicate events from the ETL or message.

The state-store 412 can be configured to store, maintain, or otherwise manage data 308 relating to the data linkage system 406. In some embodiments, the state-store 412 can be configured to manage or store an event 304. In some embodiments, data stored in the data linkage system 406 may be stored in a database. The state-store 412 can store and retrieve the data 308 for merging the events 304. The state-store 412 can store key values to identify the streams 404 and the events 304 corresponding to the data 308. For example, the state-store 412 can be configured to identify data 308A-N corresponding to the events 304A-N from the streams 404A-N. The state-store 412 can be an in memory state store or any type and form of database or data storage configured to store data 308, the object 312, one or more counters 426A-N, one or more flags 428A-N, or any other electronic record. The state-store 412 can be configured to store the objects 312 for a predetermined amount of time. For state-store, the state-store 412 can be configured to delete or remove the objects 312 after data 308 included in the objects 312 is transmitted via the output stream 314 to the downstream applications 408.

As described above, the merger application 310 can include the event receiver 418, the object manager 420, the event router 422, and the event data transmitter 424. The event receiver 418 can be configured to receive events 304. For example, the event receiver 418 can be configured to read, identify, or receive events 304 from streams 404 in a batch or streaming fashion. In some embodiments, the event receiver 418 can be configured to receive the stream 404A. In some embodiments, the event receiver 418 can be configured to receive the event 304B from the stream 404B. The event receiver 418 can further be configured to determine or identify an identifier from the event 304B. The event receiver 418 can be configured to subscribe to the events 304 arriving from event message brokers 410 and the retry message broker 432. In some cases, events 304 of some of the products 402 can be missing from one of the streams 404 but arrive as part of other streams 404. In these cases, the event receiver 418 can be configured to consolidate the streams 404 for the particular product 402.

The event receiver 418 can be configured to update or set flags 428 to indicate receipt of the events 304. In some embodiments, the event receiver 418 can be configured to update, responsive to creating the object 312 using attributes or data 308A of the event 304A, the object 312 with a flag 428A (e.g., S1) indicating that the event 304A from the stream 404A has been received. The event receiver 418 can be to update, responsive to updating the object 312 using attributes or data 308B of the event 304B, the object 312 with a flag 428B (e.g., S2) indicating that the event 304B from the retry stream 434 has been received.

The event receiver 418 can be configured to identify attributes corresponding to the events 304. The event receiver 418 can be configured to assign attributes to the events 304. For example, the event receiver 418 can be configured to generate and assign user identifiers to events 304 from anonymous users. The event receiver 418 can be configured to identify the product 402 corresponding to the events 304. For example, the event receiver 418 can identify the server that established a network session represented by the events 304. The event receiver 418 can be configured to identify attributes within the data 308 to identify the products 402 corresponding to the events 304.

The event receiver 418 can be configured to identify or monitor for events 304 that arrive after data 308 included in the object 312 to which they belong was already transmitted to the downstream applications 408. For example, if event 304B arrives (and its data 308B should be included in object 312) after the data 308A of the event 304A was transmitted to the downstream applications 408, then the event receiver 418 can be configured to identify the arrival of event 304B. The event receiver 418 can be configured to assign the flag 428 to the events 304 that arrive late such that they are transmitted to the downstream applications 408 without waiting for corresponding events, as there would not be any, since for example, event 304A was already transmitted when event 304B arrived.

The object manager 420 of the merger application 310 can be configured to identify or determine associated events 304. The object manager 420 can identify or determine associated events 304 based on an identifier identifying the event 304. For example, the identifier can be a session ID, a user ID, a payment ID, or an activity ID (e.g., interaction with a content item). The object manager 420 can be configured to associate multiple events 304 that each have the same or common identifier. For example, the object manager 420 can associate two events 304 having the common identifier. In some embodiments, the object manager 420 can be configured to determine that the identifier of the data 308B from the event 304B matches an identifier of the data 308 included in the object 312. By associating the events 304, the object manager 420 can be configured to include the data 308 of the associated events 304 into the object 312. In some embodiments, the object manager 420 can associate multiple events with each other without relying on the identifier of the event. In some embodiments, the object manager 420 can be configured to identify one or more attributes from the event 304A and object manager 420 can be configured to apply a probabilistic or machine learning (ML) approach using the identified attributes for linking data 308 of such events 304.

The object manager 420 can be configured to combine or merge the events 304 of different streams 404. The object manager 420 can be configured to merge the data 308 of events 304 having a common identifier into the object 312. For example, if event 304A and event 304B have a common identifier, then the object manager 420 can determine to merge the data 308A of the event 304A and the data 308B of the event 304B. The object manager 420 can include or use one or more rules according to which to merge data from the events into an object 312. For instance, the one or more rules can identify which attributes from a first event to include in the object and which attributes from a second event to include in the object. For example, if event 304A includes data 308A with attributes A and B while event 304B includes data 308B with attributes B and C, then the object manager 420 can be configured to combine attributes A, B, and C as data 308 included in the object 312 based on the rules for merging data from the events into the object.

The object manager 420 can be configured to create or generate objects 312 using the data 308 of the events 304. In some embodiments, the object manager 420 can be configured to create, responsive to receiving the event 304A from a stream 404A, the object 312 including data 308A from the event 304A. The object can be used to merge the data 308A from the event 304A with data 308B from event 304B of a stream 404B that may not have yet arrived. In some embodiments, to create the object for the event 304A, the object manager 420 can be configured to create the object 312 for the event 304A responsive to determining that an identifier of the event 304A does not match an identifier of any object 312 stored by the state-store 412. For example, the object manager 420 can be configured to create the object 312 for the event 304A if the event 304A is not associated with another object 312. The object manager 420 can generate the object 312 from data 308 of events 304 in streams 404 that fail to arrive or arrive out of order or delayed. In some cases, the object manager 420 can be configured to create objects 312 from previously created objects 312 stored in the state-store 412.

The object manager 420 can be configured to update or modify the objects 312. The object manager 420 can be configured to update or modify the objects 312 responsive to receiving another event having an identifier that matches the identifier used to create the object. The object manager 420 can be configured to determine or identify whether events 304 corresponding to events 304 in the retry stream 434 have arrived. The object manager 420 can be configured to update the object 312 with data 308 from the events 304 that arrive in stream 404. For example, the arrival order of the streams 404 can be stream 404B, stream 404A, and stream 404C. In some embodiments, the object manager 420 can process the event 304B to update the object 312 to include the data 308B. The object manager 420 can create the object 312 with data 308B from event 304B of stream 404B, then update the object with data 308A from event 304A of stream 404A, and then update the object with data 308C from event 304C of stream 404C. In some embodiments, the object manager 420 can process the event 304B to update the object 312 to include the data 308B. Once the object 312 is created, the object manager 420 can store or add, as the data 308A, the one or more attributes in the object 312.

The object manager 420 can be configured to store or manage the data 308 of the objects 312 in the state-store 412. The object manager 420 can store the object 312 in the state-store 412 until a condition is met. For example, the object manager 420 can be configured to update the object 312 using data from one or more additional events corresponding to the object and responsive to updating the object, determine that the object 312 is complete, and then transmit the object to the downstream application via the output stream 314. The object manager 420 can be configured to delete or remove the object 312 from the state-store 412 upon transmitting the object 312 to the downstream application 408.

The object manager 420 can be configured to determine or identify whether the object 312 is complete. The object manager 420 can be configured to determine that the object 312 is complete if all the events 304 from all the streams 404 corresponding to the object have arrived. Whenever an event 304 arrives from a stream 404, the object 312 can be updated with the event 304 from the arrived stream 404. Whenever an event 304 arrives from a particular stream 404, the object manager 420 can be configured to update the object 312 to include the attributes corresponding to the stream 404 (e.g., S1, S2, S3, etc.). The object manager 420 can use the attributes to determine if the streams 404 for a particular key identifier have arrived and to determine if the object 312 is complete. For example, the object manager 420 determine that stream 404A arrived if the data 308 included in the object 312 includes the attribute (e.g., S1) corresponding to the stream 404A. The object manager 420 can be configured to identify that the object 312 is complete if the event receiver 418 receives an event 304 of the object 312 that is not the event 304. For example, the object manager 420 can identify that the object is complete if the event 304B arrives after the event 304A. In some embodiments, the object manager 420 can be configured to set a flag in the object 312 responsive to determining that the object is complete. In some embodiments, the object manager 420 can also set a flag or assign a flag to the object responsive to determining that the object 312 has been transmitted or is to be transmitted to the downstream application. Additional details regarding the flags are provided below with respect to the event data transmitter 424.

The event router 422 of the merger application 310 can be configured to route, push, or forward events 304 to the recoil message broker 414. In some embodiments, to route the event 304A, the event router 422 can be configured to pass the event 304A to the recoil message broker 414 corresponding to the retry stream 434. In some embodiments, the event router 422 can be configured to route the event 304A to the retry stream 434 to reprocess the event 304A responsive to determining that the object 312 does not include the data 308B from the event 304B and a number of times the event 304A has been routed to the retry stream 434 does not satisfy a threshold. For example, event router 422 can be configured to analyze the event 304B from stream 404B to determine if the object 312 already has attributes corresponding to stream 404A and stream 404C (e.g., S1 and S3). Based on the determination, the event router 422 can determine if the corresponding event 304A from stream 404A has arrived or not. If the attributes corresponding to the stream 404A and stream 404C are not present in the object 312, the event router 422 can configure the event 304B from stream 404B with the configured threshold, and push the configured event 304B to the recoil application 416 via the recoil message broker 414.

The event router 422 can be configured to route, forward, or push event 304 based on the counter 426. The counters 426A-N (e.g., retry count) can be configured to indicate or identify a number of times remaining for routing the events 304 from incomplete objects 312 to the recoil application 416 via the recoil message broker 414. The counter 426 can indicate a number of times to route the events 304 until corresponding events 304 arrive to complete the object 312. The downstream applications 408 can be configured to modify the counter 426. The downstream application 408 can be configured with a monitoring mechanism to periodically check and accordingly change the counter 426 if a number of events without data linkage satisfies a threshold. For example, if the downstream application 408 receives too many unlinked events because the counter 426 is so low that unlinked are sent before linked events arrive, then the downstream application 408 can increase the counter 426 to allow for additional retries to wait for the other events to arrive. The intervals can be configured based on the events 304. The counter 426 can be configured based on latency of the products 402. For example, the counter 426 can be set to five for events 304 relating to products 402 for streaming content items and can be set to 10 for events 304 relating to products 402 for provisioning devices. The counter 426 can be decremented from the set value whenever the events 304 are routed. When the counter 426 reaches zero, the threshold can be satisfied.

If the object 312 is not complete (e.g., missing data 308B from event 304B), then upon the event being routed to the recoil application 416, the event router 422 can update a counter 426 of how many times the event 304A was rerouted while waiting for the event 304B. In some cases, the event router 422 can be configured to route the first arriving stream to the recoil application 416 rather than sending all the streams. By only sending the first arriving stream of multiple streams 404, the event router 422 can avoid reprocessing multiple streams 404 that belong to the same object 312.

The event router 422 can be configured to identify, modify, or update the counter 426. The event router 422 can be configured to decrement or update the counter 426 to indicate routing of the events 304. For example, the event router 422 can generate a counter 426 for the event 304A of the object 312 that is incomplete. In another example, the event router 422 can generate a counter 426 for every event 304 of the object 312 that is incomplete. The event router 422 can be configured to identify the counter 426 to determine the number of times the events 304 can be routed. The event router 422 can be configured to route the events 304 until the counter 426 satisfies the threshold, such as reaching a value of zero.

The event router 422 can route, forward, or push the event 304 for transmission to downstream applications 408. The event router 422 can determine that the object 312 does not include the data 308B from the event 304B and the number of times the event 304A has been routed to the retry stream 434 satisfies the threshold. Upon determining that the number of times as indicated by the counter 426 satisfies the threshold, the event router 422 can push the event 304B to the event data transmitter 424 for transmission via the output stream 314 to the downstream applications 408.

The event router 422 can be configured to drop or delete events 304. In some embodiments, the event router 422 can be configured to determine that the object 312 does not include the data 308B from the event 304B and the number of times the event 304A has been routed to the retry stream 434 satisfies the threshold. In certain embodiments, the event router 422 can be configured to drop the event 304A responsive to the event data transmitter 424 transmitting either the data 308A stored in the object 312 or the data 308A and the data 308B stored in the object 312. In another example, the event router 422 can be configured to drop the event 304 responsive to transmitting the event 304 to the recoil application 416.

The event router 422 can be configured to assign flags 428 (e.g., O) to objects 312 to indicate that the data 308 included in the object 312 is to be transmitted. The flags 428 can be configured to indicate or identify objects 312 selected for transmission. For example, the flag can be a data structure or an indicator (e.g., O) appended to the object 312 to indicate that the data 308 included in the object is to be transmitted.

In some embodiments, the event router 422 can be configured to assign the flag 428 responsive to the event router 422 determining that the object 312 does not include the data 308B and the number of times the event 304A has been routed to the retry stream 434 satisfies the threshold. For example, after retrying the event 304A such that the counter 426 satisfies the threshold, the event router 422 can be configured to assign a flag 428C to transmit the data 308A included in the event 304B without continuing to wait for the event 304B and its data 308B. In some embodiments, the event router 422 can be configured to assign the flag 428C to the object 312 indicating that the data 308 included in the object 312 is to be transmitted responsive to the object manager 420 determining that the object 312 includes the data 308B.

The event data transmitter 424 of the merger application 310 can be configured to transmit or send the data 308 included in the object 312. The event data transmitter 424 can transmit or send data 308 included in the object 312 after identifying or determining that the object 312 includes the flag 428 indicating that the data 308 is to be transmitted. The event data transmitter 424 can be configured to transmit the data 308 with attributes from events 304 of streams 404 that were provided by products 402. The event data transmitter 424 can be configured to transmit the data 308 to the downstream applications 408, which can use the relevant data 308 for analytics. In some embodiments, to transmit the data 308 included in the object 312, the event data transmitter 424 can be configured to transmit events 304 that include data 308.

The event data transmitter 424 can be configured to transmit or send the data 308 when all the corresponding events 304 have arrived. In some embodiments, the event data transmitter 424 can be configured to transmit the data 308A and the data 308B included in the object 312 responsive to processing the event 304B to update the object 312 to include the data 308B. For example, if event 304B arrives to complete the object 312, the event data transmitter 424 can transmit data 308 in the object 312 to the output stream 314.

The event data transmitter 424 can be configured to transmit or send events 304 even if corresponding events 304 failed to arrive or be identified by the event receiver 418. For example, by sending some of the events 304, downstream applications 408 are not left waiting for data 308 until events 304 (that may not arrive) end up arriving. In some embodiments, the event data transmitter 424 can be configured to transmit the data 308A included in the object 312 responsive to the event router 422 determining that the object 312 does not include the data 308B from the event 304B and the number of times the event 304A has been routed to the retry stream 434 satisfies the threshold. For example, if the event 304B corresponding to the event 304A does not arrive even after a predetermined time interval and the event 304A was routed a number of times that satisfied the threshold, then the event data transmitter 424 can transmit the event 304A with data 308A of the event 304A.

In some embodiments, the event data transmitter 424 can be configured to generate a derived event that includes other events 304. For example, the event data transmitter 424 can be configured to generate the derived event that includes data 308 from the event 304A and the event 304B. The event data transmitter 424 can then be configured to transmit the data 308 included in the derived event. For example, the event data transmitter 424 can be configured to transmit the derived event or the linked event for the plurality of events 304 from the plurality of streams 404.

As described above, responsive to determining that the object corresponding to the event is incomplete and the counter does not satisfy the threshold, the merger application 310 can forward the event to the recoil application 416 via the recoil message broker 414. The recoil message broker 414 can be configured to process, receive, or forward routed events 304 from the merger application 310. For example, the event router 422 can be configured to transmit event 304A to the recoil message broker 414 if the object manager 420 is waiting for the event 304B, which is associated with event 304A and its data 308B to be included in the object 312A. The recoil message broker 414 can be configured to receive events 304 from the merger application 310. The recoil message broker 414 can be configured to transmit, send, or push the events 304 to the recoil application 416. The recoil message broker 414 can be configured to transmit, send, or push the events 304 after a predefined or predetermined delay.

The recoil application 416 can be configured to be a retry mechanism where out of order events 304 are delayed by to provide consolidate data 308 of the events 304. For example, the recoil application 416 can be configured to handle events that arrive early or events for which corresponding events have not arrived. The recoil application 416 can be configured to read events 304 from the recoil message broker 414 based on the configured interval and push the event 304 to the retry stream 434. The recoil application 416 can be configured to push the events 304 to the merger application 310 via the retry stream 434 after a configured, predefined, or predetermined delay.

The retry streaming application 430 can be configured to process, maintain, receive, or forward events 304 from the recoil message broker 414. The retry streaming application 430 can be configured to receive events 304 from the recoil message broker 414. The retry streaming application 430 can subscribe to the retry events 304. The retry streaming application 430 can be configured to listen or maintain the events 304 of the retry stream 434 at configured intervals. In some embodiments, the retry streaming application 430 can be configured to push the events 304 to the merger application 310 via the retry stream 434 after a configured, predefined, or predetermined delay. For example, the retry streaming application 430 can be configured to maintain the retry event 304 every 5 seconds. The retry streaming application 430 can be configured with a retry interval during which to read or analyze the events 304 from the recoil message broker 414. The retry interval can be a threshold time during which the retry streaming application 430 maintains the events 304. The retry interval can be configured to maintain or forward the events 304 in a consistent manner. For example, the retry interval can be 5 seconds between the retry streaming application 430 receiving the events 304 and forwarding the retry events 304 to the retry message broker 432. The retry streaming application 430 can be configured to modify the intervals. The intervals can be configured based on the events 304 or based on a data quality of the streams 404. For example, the intervals can be 5 seconds for events 304 relating to products 402 for streaming content items and 10 seconds for events 304 relating to products 402 for provisioning devices. The retry streaming application 430 can be configured to determine whether to route the event 304 to the recoil application 416 based on the retry interval. For example, the retry streaming application 430 can route the event 304A of a stream 404A to the recoil application 416 if the stream 404B has arrived at t1 and 404A arrives within the configured interval if t1+δ, wherein t1+δ<(retryCouneretryInterval).

The retry message broker 432 can be configured to push the events 304 from the retry streaming application 430 into the retry stream 434. The retry message broker 432 can be an event handler or interface that translates messages from the retry streaming application 430 for transmission to the event message brokers 410.

The retry stream 434 (also known as a retry topic) can include the events 304 selected to be rerouted and reprocessed. For example, the retry stream 434 includes the data 308A of the event 304A that can be rerouted until the data 308B of the event 304B is available. The retry stream 434 is generated by the retry message broker 432 for transmission to the event message brokers 410.

Figure 5:
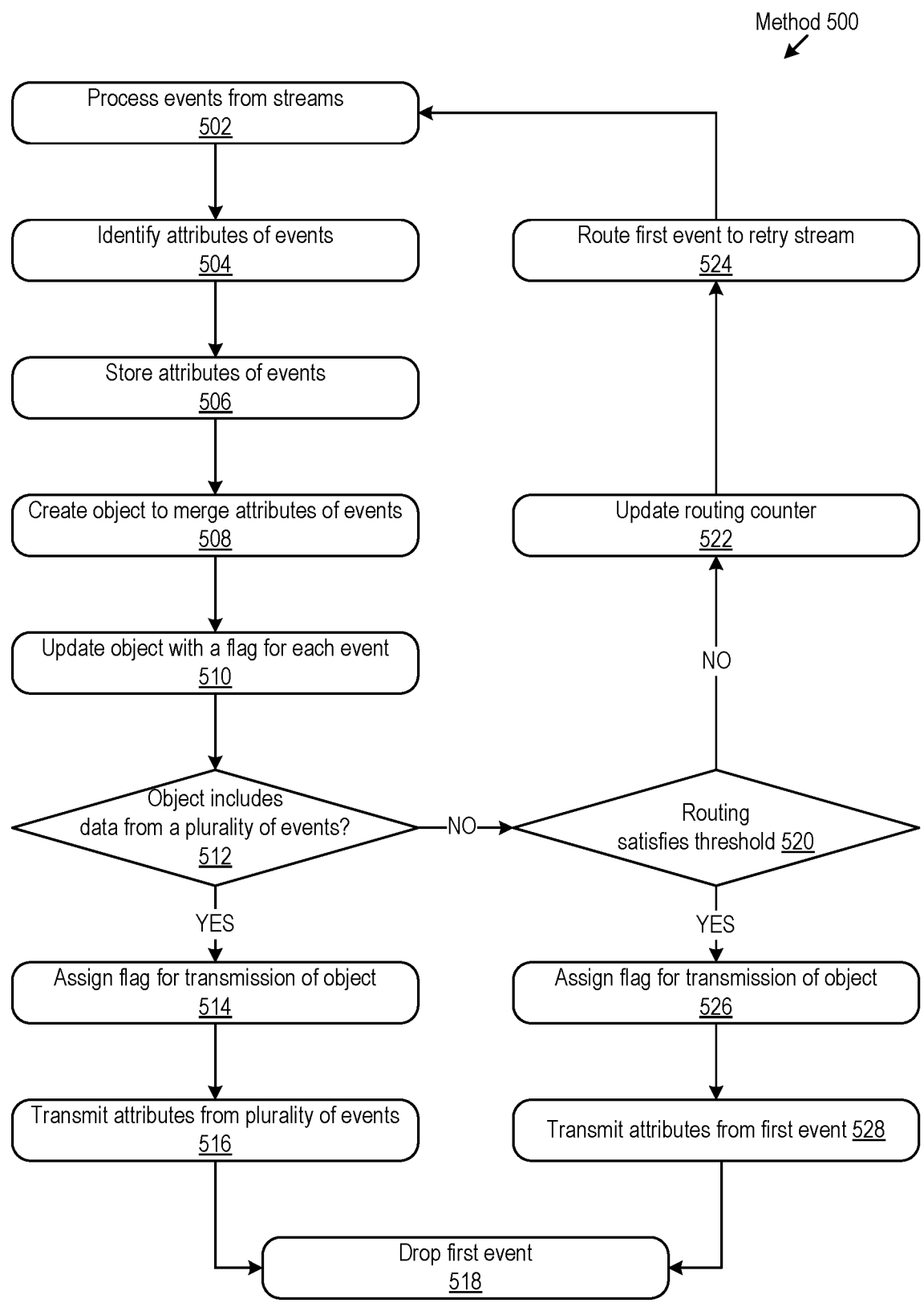
FIG. 5 is a diagram of a method for data linkage and entity resolution of continuous and un-synchronized data streams, in accordance with one or more embodiments.

Referring now to FIG. 5, FIG. 5 depicts a diagram of a method 500 for data linkage and entity resolution of continuous and un-synchronized data streams, in accordance with one or more embodiments. The components described in FIGS. 1-4, and/or the data linkage system 406 detailed above can perform the operations and functionalities of the method 500. In brief overview, a data linkage system (e.g., data linkage system 406) executed by one or more processors can process events (e.g., events 304) from streams (e.g., streams 404) (STEP 502). The data linkage system can identify attributes (e.g., data 308) of the events (STEP 504). The data linkage system can store attributes of the events (STEP 506). The data linkage system can create objects (e.g., objects 312) to merge attributes of events (STEP 508). The data linkage system can update object with a flag for each event (STEP 510). The data linkage system can identify whether the object includes data from a plurality of events (STEP 512). If the object includes data from the plurality of events, then the data linkage system can assign a flag for transmission of the object (STEP 514). The data linkage system can transmit the attributes from the plurality of events (e.g., data 308A and data 308B) (STEP 516). The data linkage system can drop the first event (STEP 518). If the data linkage system identifies that the object does not include data from the plurality of events, then the data linkage system can identify whether the routing counter satisfies the threshold (STEP 520). If the routing counter does not satisfy the threshold, then the data linkage system can update the routing counter (e.g., counter 426) (STEP 522). The data linkage system can route the first event to a retry stream (e.g., recoil application 416) (STEP 524) and proceed to process additional events from additional streams (STEP 502). If the data linkage system identifies that the routing threshold is satisfied, then the data linkage system can assign a flag for transmission of the object (STEP 526). The data linkage system can transmit (e.g., output stream 314) the attributes from the first event (e.g., data 308A) (STEP 528).

Referring now to FIG. 5 and in further detail, the data linkage system can process events (e.g., events 304) from streams (e.g., streams 404) (STEP 502). For example, the data linkage system can receive events from products (e.g., products 402). The streams from the products can arrive at the data linkage system. The data linkage system can transform the events. In some embodiments, the data linkage system can subscribe to the first stream, the second stream, and the retry stream. For example, the data linkage system can monitor the products for the subscribed streams. The data linkage system can identify the subscribed streams from a plurality of streams.

The data linkage system can identify attributes (e.g., data 308) of the events (STEP 504). For example, the data linkage system can identify attributes of the events in the streams arriving from the products and the recoil application. In some embodiments, the data linkage system can identify one or more attributes from the first event. In some embodiments, the data linkage system can to determine an identifier from the second event. For example, the data linkage system can identify attributes in different events. The data linkage system can store attributes of the events (STEP 506). For example, the data linkage system can store the attributes in a state-store (e.g., state-store 412).

The data linkage system can create or generate objects (e.g., objects 312) to merge attributes of events (STEP 508).

For example, the data linkage system can create objects to store data from one or more events in the one or more streams. In some embodiments, the attributes from the first event can be used to populate the object. For example, the data linkage system can identify attributes in the first event that arrives. In some embodiments, the data linkage system can store, as the first data, the one or more attributes in the object. For example, the data linkage system can store the attributes in the object. In certain embodiments, the data linkage system can create the object for the first event responsive to determining that an identifier of the first event does not match an identifier of any object stored by the one or more processors. For example, the data linkage system can create the object in response to determining that the data in the event does not correspond to an already created object. The data linkage system can assign an identifier to the object that corresponds to the identifier of the first event used to create the object. The data linkage system can store the object in the state-store.

The data linkage system can create the object for including additional data from other events of streams. In some embodiments, the data linkage system can create the object responsive to processing a first event from a first stream. In some embodiments, the data linkage system can update the object responsive to creating the object including the first data of the first event. For example, the data linkage system can create an object including first data from the first event for merging the first data with second data from a second event of a second stream. In some embodiments, the data linkage system can create an object including first data from the first event for merging the first data with second data from a second event of a second stream. For example, the object can be updated with the second data from the second event.

The data linkage system can identify data of events to include in the objects. In some embodiments, the data linkage system can determine that the identifier from the second event matches an identifier of the object. In such situations, the object was created from data of the first event. Based on the match, the data linkage system can include data from the second event in the object. In some embodiments, the data linkage system can store, as the second data, one or more attributes from the second event in the object.

The data linkage system can update the object with a flag for each event (STEP 510). In some embodiments, the data linkage system can update the object with a first flag indicating that the first event from the first stream has been received. For example, the data linkage system can update the object with a flag corresponding to each event whose data is included in the object. In some embodiments, the data linkage system can update the object with a second flag indicating that the second event from the second stream has been received. In some embodiments, the data linkage system can update the object with the second flag responsive to updating the object to include the second data of the second event. For example, the data linkage system can update the flag after the additional events arrive and their data included in the object.

The data linkage system can identify whether the object includes data from a plurality of events (STEP 512). For example, the data linkage system can determine whether the object is complete by including data from all associated objects, such as those having a common identifier. If the object is not complete, the data linkage system can identify whether the object includes the first event. For example, if the object does not include the first event, the data linkage system can update the object with attributes of the first event when it arrives.

If the object includes data from a plurality of events, then the data linkage system can assign a flag for transmission of the object (STEP 514). In some embodiments, the data linkage system can assign the flag to the object responsive to determining that the object includes the second data. For example, the data linkage system can assign flags to objects that have data for transmission. In some embodiments, the data linkage system can assign a flag to the object indicating that the data is to be transmitted. For example, the data linkage system can send data included in objects with the flag.

The data linkage system can transmit the attributes (e.g., data 308A and data 308B) from the plurality of events (STEP 516). For example, the data linkage system can push data of the events to downstream applications (e.g., downstream applications 408). In some embodiments, the data linkage system can transmit the first data and the second data included in the object. In some embodiments, the data linkage system can transmit the first data and the second data responsive to processing the second event to update the object to include the second data. For example, the data linkage system can send the data included in the object. In some embodiments, the data linkage system can generate a third event comprising one or more attributes from the first event and the second event. In some embodiments, the data linkage system can generate the third event responsive to determining that the object includes the second data. For example, the data linkage system can generate the third event to include merged data from the first event and the second event. In some embodiments, the data linkage system can transmit the third event.

The data linkage system can drop the first event (STEP 518). In some embodiments, the data linkage system can drop the first event responsive to transmitting either the first data stored in the object or the first data and the second data stored in the object. For example, the data linkage system can drop or delete the event after sending its data.

If the data linkage system identifies that the object does not include data from the plurality of events, then the data linkage system can identify whether the routing satisfies the threshold (STEP 520). The data linkage system can identify that the object is incomplete. Incomplete objects do not include data from all associated events. Depending on how many times the events of the incomplete objects have been rerouted to wait for associated events and their data to arrive, the data linkage system can either send events of incomplete objects to downstream applications or continue to reroute the event to wait for associated events and their data to arrive. For example, if the object includes the first event but not the second event with the common identifier, then the data linkage system can identify whether the retry threshold is satisfied.

If the routing does not satisfy the threshold, then the data linkage system can update the routing counter (e.g., counter 426) (STEP 522). In some embodiments, the data linkage system can update a count indicating the number of times the first event has been routed to the retry stream. For example, the data linkage system can decrease the counter by one whenever the event is rerouted.

The data linkage system can route the first event to a retry stream (e.g., recoil application 416) (STEP 524) and proceed to process additional events from additional streams (STEP 502). In some embodiments, the data linkage system can route the first event to a retry stream to reprocess the first event responsive to determining that the object does not include the second data from the second event and a number of times the first event has been routed to the retry stream does not satisfy a threshold. For example, if the object has been sent, the data linkage system can drop, remove, or delete the first event. In some embodiments, the data linkage system can determine that the object does not include the second data and the number of times the first event has been routed to the retry stream does not satisfy the threshold. In some embodiments, the data linkage system can pass the first event to a message broker corresponding to the retry stream. For example, if the object has not been sent, the data linkage system can push the first event to a retry stream. The data linkage system can subscribe to the retry stream to monitor for the rerouted event to arrive again.

If the data linkage system identifies that the routing threshold is satisfied, then the data linkage system can assign a flag for transmission of the object (STEP 526). For example, if the threshold is not satisfied, the data linkage system can identify whether the data included in the object has been sent to downstream applications. If the data has not been sent, then the data linkage system can update the object with data for transmission. In some embodiments, the data linkage system can assign a flag to the object indicating that the data is to be transmitted. In some embodiments, the data linkage system can assign the flag to the object responsive to determining that the object does not include the second data and the number of times the first event has been routed to the retry stream satisfies the threshold. For example, after rerouting the event too many times, the data linkage system can assign the flag to transmit the data even if additional data from additional events fails to arrive. In some embodiments, the data linkage system can generate, responsive to determining that the object does not include the second data and the number of times the first event was routed to the retry stream satisfies the threshold, a fourth event comprising one or more attributes from the first event. In some embodiments, the data linkage system can generate the fourth event responsive to determining that the object does not include the second data and the number of times the first event was routed to the retry stream satisfies the threshold. For example, the data linkage system can generate the fourth event with the just the data of the event that arrived. In some embodiments, the data linkage system can transmit the third event or the fourth event.

The data linkage system can transmit (e.g., output stream 314) the attributes (e.g., data 308A) from the first event (STEP 528). In some embodiments, the data linkage system can transmit the first data included in the object. For example, the data linkage system can transmit the attributes from the first event even if the attributes from other events fail to arrive. In some embodiments, the data linkage system can transmit the first data responsive to determining that the object does not include the second data from the second event and the number of times the first event has been routed to the retry stream satisfies the threshold. For example, after the first event with the first data has been rerouted a number of times that satisfies the threshold, the data linkage system can transmit the first data even though data from other events fails to arrive.

Figure 6:
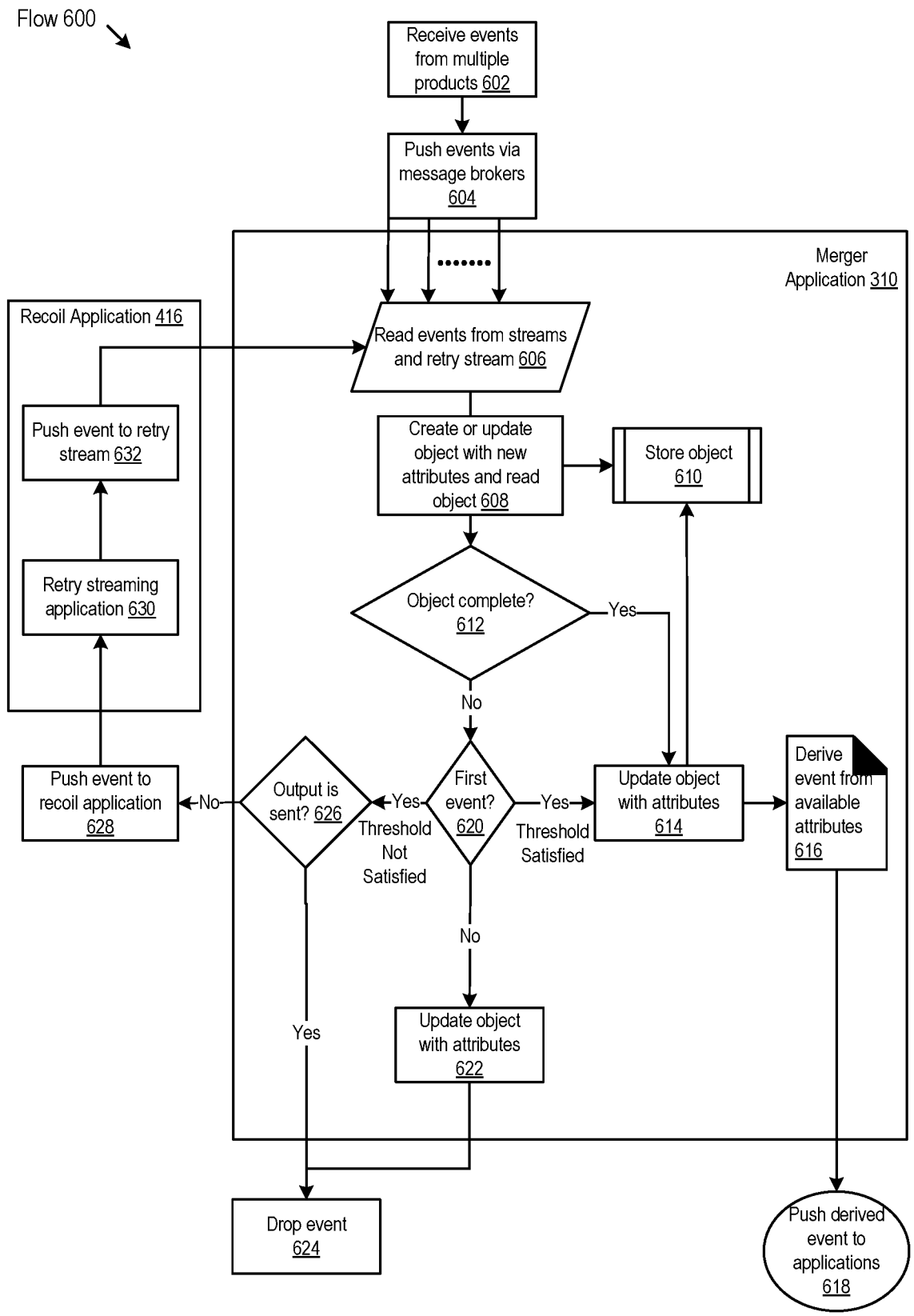
FIG. 6 is a diagram of a flow for data linkage and entity resolution of continuous and un-synchronized data streams, in accordance with one or more embodiments.

Referring now to FIG. 6, FIG. 6 depicts a diagram of a workflow 600 of the data linkage system 406 in FIG. 4 performing the method 500 shown in FIG. 5 for data linkage and entity resolution of continuous and un-synchronized data streams, in accordance with one or more embodiments. For example, the components described in FIGS. 1-4, and/or the data linkage system 406 detailed above can perform the operations and functionalities of the workflow 600. In brief overview, the ETL 302 can receive events 304 from multiple products (STEP 602). The ETL 302 can push events via the event message brokers 410 (STEP 604). The merger application 310 can read events 304 from multiple streams 404 and the retry stream 434 (STEP 606). The merger application 310 can create or update objects with data 308 and read the object 312 (STEP 608). The merger application 310 can store the object 312 (STEP 610). The merger application 310 can identify whether the object 312 is complete (STEP 612). If the object 312 is complete, the merger application 310 can update the object 312 with data 308 (STEP 614). The merger application 310 can derive events 304 from data 308 (STEP 616). The merger application 310 can push events 304 to downstream applications 408 (STEP 618). If the object 312 is not complete, the merger application 310 can identify whether the object 312 includes the event 304A (STEP 620). If the object does not include the event 304A, the merger application 310 can update the object 312 with attributes (STEP 622). The merger application 310 can drop the first event 324A (STEP 624). If the object 312 includes the event 304A, then the merger application 310 can identify whether the retry threshold is satisfied. If the threshold is satisfied, then the merger application 310 can update the object 312 with data 308 (STEP 614). If the threshold is not satisfied, the merger application 310 can identify whether the object 312 has been sent (STEP 626). If the object 312 has been sent, the merger application 310 can drop the event 304A (STEP 624). If the object has not been sent, the merger application 310 can push the event 304A to the retry streaming application 430 of the recoil application 416 (STEP 628). The retry streaming application 430 can subscribe to the event 304A (STEP 630). The retry message broker 432 of the recoil application 416 can push the event 304A to the merger application 310 (STEP 632).

Referring now to FIG. 6 and in further detail, the ETL 302 can receive events 304 from multiple products (STEP 602). The events 304 can be in multiple streams 404. For example, the ETL 302 can receive two streams 404, such as stream 404A from product 402A and streams 404B from product 402B. Both streams 404 can arrive in the same micro-batch or with a delay between them. The ETL 302 can push events 304 via the event message brokers 410 (STEP 604). The ETL 302 can process the events 304 of the streams 404 and push them to the merger application 310. For example, the streams 404 from all the products 402 can arrive at the ETL 302, which can perform transformations and push the events 304 from the streams 404 to the event message brokers 410. The streams 404 from each product 402 can arrive at a corresponding event message broker 410. For example, each product 402 can have its own event message broker 410.

The merger application 310 can read events 304 from multiple streams 404 and the retry stream 434 (STEP 606). The merger application 310 can subscribe to the events 304 arriving from the event message brokers 410 corresponding to multiple products 402 as well as subscribe to the retry stream 434. For incoming events 304, the merger application 310 can derive or fetch the key identifier from the events 304 and check if corresponding objects 312 exists for the key identifier. For example, whenever the events 304 of the streams 404 arrive, the merger application 310 can check for a presence of objects 312 that include data of events 304 of the streams 404. The merger application 310 can create or update objects with data 308 and read the object 312 (STEP 608). For example, if the object 312 is already present, then the merger application 310 can update the object 312 with data 308 of the events 304 of the streams 404. In another example, the merger application 310 can create a new object 312 with the data 308 in the event 304. The creation of a new object 312 can indicate that the event 304 is the first event for a particular identifier. The merger application 310 can store the object 312 (STEP 610). For example, the merger application 310 can store the object 312 in the state-store 412.

The merger application 310 can identify whether the object 312 is complete (STEP 612). For example, at any point in time, the object 312 can include data 308 or other information about the arrived events 304 to determine the completeness of the object 312. The object 312 can be considered complete if all of its events 304 from all the streams 404 have arrived such that the object 312 includes the data 308 from all the arrived events 304. In some cases, the merger application 310 can identify if the object 312 is complete if the event 304 is not the first event that arrived. For example, whenever an event 304 arrives from a particular stream 404, the attributes and the object 312 can be updated with a flag 428 of that particular stream 404 (e.g., S1, S2, S3, etc.). The flags 428 can be used to determine if all the streams 404 for that particular key identifier have arrived and to determine if the object 312 is complete. The merger application 310 can determine if the object 312 is complete or retries are exhausted. If the object 312 is complete, the merger application 310 can update the object 312 with data 308 (STEP 614).

The merger application 310 can derive events 304 from data 308 (STEP 616). For example, the merger application 310 can create a derived event from the data 308 of different events 304. The merger application 310 can construct the derived event from whatever data 308 is present in the object 312. The derived event generated with the available attributes can be pushed to the output stream 314 for consumption by downstream applications 408. The merger application 310 can push events 304 to downstream applications 408 (STEP 618). The merger application 310 can update the object 312 with a flag (e.g., O) indicating output. If the object 312 is incomplete, the merger application 310 can identify whether the object 312 includes the event 304A (STEP 620). For example, the merger application 310 can check if the arriving event 304 is a first event 304A. If the event 304 is the first event 304A and retries have been exhausted, then the event 304A can be updated with the flag 428 for transmission (e.g., 0). If the object 312 does not include the event 304A because the event 304A is a first event, then then merger application 310 can configure a retry count (e.g., counter 426) for the event 304A. The merger application 310 can determine that events 304 with a retry count are included in the object 312. The merger application 310 can append the retry count before the event 304 is sent to the recoil application 416. The merger application 310 can propagate the first event 304A to the recoil application 416 to ensure that other events 304 in the stream are not reprocessed repeatedly by the merger application 310. If the object 312 does not include the event 304A, the merger application 310 can update the object 312 with attributes (STEP 622). For example, if the event 304A is not the first event 304, then the merger application 310 can update the data 308 of that event 304 into the object 312. The merger application 310 can drop the event 304A (STEP 624). For example, once the data 308A is included in the object 312, the merger application 310 can drop the event 304A.

If the object 312 includes the event 304A, then the merger application 310 can identify whether the retry threshold is satisfied. If the threshold is satisfied, then the merger application 310 can update the object 312 with data 308 (STEP 614). For example, in case the corresponding event 304B does not arrive after the configured time interval and the counter 426A satisfies the threshold, then the existing data 308A included in the object 312A can be sent. For example, by sending the data 308A and not waiting for data 308B, downstream dependent jobs are not impacted. If the event 304B does eventually arrive, the merger application 310 can proceed to drop the event (STEP 624) or to the event 304B (STEP 618). If the threshold is not satisfied, the merger application 310 can identify whether the object 312 has been sent (STEP 626). For example, if the event 304 is the first event 304A and the final output (e.g., derived event) is not yet sent, then the merger application 310 can pass the event 304 to the recoil application 416 by modifying, adding, or decrementing the counter 426. If the object 312 has already been sent, the merger application 310 can drop the event 304A (STEP 624). If the object 312 has not been sent, the merger application 310 can push the event 304A to the retry streaming application 430 of the recoil application 416 (STEP 628). For example, the merger application 310 can push retry events to the recoil message broker 414. The recoil message broker 414 can be any recoil message broker 414 that can be reliable and fault-tolerant. The merger application 310 can decrement or otherwise modify the counter 426A after pushing the event 304A to the retry streaming application 430. The merger application 310 can proceed to push the event 304A to the retry streaming application 430 until the counter 426A satisfies the threshold, such as reaching zero.

The retry streaming application 430 can subscribe to the event 304A (STEP 630). For example, the retry streaming application 430 can listen to the retry events at preconfigured intervals. The retry message broker 432 of the recoil application 416 can push the event 304A to the merger application 310 (STEP 632). For example, after a predetermined time interval, the retry streaming application 430 can push the event 304A back to the merger application 310 via the retry stream 434. To receive the event 304A from the retry streaming application 430, the merger application 310 can listen for or subscribe to the event 304A. The merger application 310 can listen for messages and continue the cycle until the object 312 either is complete or the retry count threshold is satisfied (e.g., becomes 0). Since the retry count and retry threshold can be configured according to use cases, the data 308 in the output stream 314 can fall into the bucket of successfully derived events.

In view of the foregoing, it should be appreciated that the systems and methods described herein can provide various technical improvements. In particular, one technical improvement provided by the present disclosure can include low latency. The recoil application can emit the derived event in less time by executing on the streaming path rather than the batch path. Emitting the derived event in less time reduces the latency to help achieve the network objectives in less time. The merger application can reduce latency by sending only the first event for retry in the whole cycle of merging even when there are multiple streams. This approach avoids repeated processing of multiple streams in the same cycle.

Another technical improvement provided by the present disclosure can include handling unordered streams. Since the events are generated by different products, the events can arrive out of order. For example, the arrival of the events can depend on the generation logic at the data source and various intermediate operations integrated into the data pipeline. A stream can also be delayed due to network issues and arrive late. The present disclosure can configure threshold ranges to handle this scenario.

Another technical improvement provided by the present disclosure includes fault tolerance. To address fault tolerance, the present disclosure provides an asynchronous mechanism to back up the state data in a data store. In case of failure, the state can be retrieved from the data store. For example, the present disclosure can use a ROCKSDB backed by HDFSBACKEDSTATESTOREPROVIDER for state storage and backup. In case of any issues, the state can be retrieved from HDFS clusters. In other examples using the aforementioned architecture, any state store that is highly performant could be used and periodically backed up to maintain fault tolerance. Internally streaming frameworks provide check-pointing functionality that provides fault tolerance in case of worker or driver node failures or application restarts.

Another technical improvement provided by the present disclosure includes scalability. Since the products continuously generate a large amount of data, the application described herein can scale to process these streams in near real-time. To achieve scalability, the present disclosure includes high performant persistent key-value stores that are write-intensive, preserve a large amount of data, and have acceptable read performance with large amount of data. For example, the present disclosure can include ROCKSDB as a state provider. However, it is contemplated that any state provider able to satisfy the characteristics described could be used with the aforementioned architecture. Since the applications do not have a shared state that is managed in a way that is broadcasted to each worker nodes in the streaming apps, the applications can be scaled easily as data increases in the state. The specialized merging of streams can be decoupled from retry logic by creating a separate application for each of them to boost the horizontal scalability of each individual application based on network traffic.

Another technical improvement provided by the present disclosure includes handling delayed streams. Since the events are generated by different products, there is no particular time range in which the stream can arrive. The difference between the event generation at source and event arrival is not constant and can vary from scenario to scenario. The architecture works effectively in the configured threshold ranges in circumstances where one of the streams is delayed.

Another technical improvement provided by the present disclosure includes extensibility. The applications described herein can be designed in such a way that it can be extended to generate derived events from multiple streams.

Another technical improvement provided by the present disclosure includes configurability. The applications described herein can be configured based on use cases and network parameters. For example, the retry count and the read interval of recoil broker (e.g., retryThreshold) can be increased or decreased based on a desired consistency of events and attributes.

Another technical improvement provided by the present disclosure includes not needing periodic state checks. For example, an event can arrive and attributes can be added into the state, but a corresponding event does not arrive. In this kind of scenario, periodic checks are not needed on the state to emit attributes whose corresponding attributes from other events have not arrived. The retry logic can ensure that those attributes are emitted out of the state and sent to the output sink for consumption in the downstream applications. A periodic check is not needed on the state to emit events for the corresponding events attributes that fail to arrive.

Another technical improvement provided by the present disclosure includes combining continuously flowing information from two or more streams in near real-time in a scalable, extensible, fault-tolerant fashion with low latency. The applications described herein can support scenarios such as the streams arriving in an unordered fashion, the steams being delayed, or the streams failing to arrive. The applications can configure the retry count and the time interval of reading messages from the recoil topic and pushing the message back to the merger application (e.g., RetryThreshold). The applications can be configured based on use cases and the arrival of events from all the streams. Network administrators and developers can tweak these parameters to achieve more eventual consistency.

These applications can be leveraged in both CITRIX and external products that combine large volumes of data arriving continuously from multiple streams or propagate information from two or more streams to other incoming streams.

D. SCENARIOS BASED ON TIMING OF VARIOUS EVENTS TO BE MERGED

The following are example scenarios that may arise when merging events received from multiple streams.

In example scenario 1, the derived events can be created from events 304 arriving from two streams 404 (e.g., stream 404A and stream 404B). One of the streams 404 can arrive late but within a configured interval. For example, stream 404B has arrived at t1 and stream 404A is yet to arrive but arrives within the configured interval (e.g., t1+δ and t1+δ< (retryCouneretryInterval)). To create the final derived event, the merger application 310 can consider data 308B such as A21, A22, A23 from stream 404B and data 308A from stream 404A such as A11, A12.

The flow for Scenario 1 is as follows:
1. Stream 404B can be listened to by the merger application 310. All the data 308B from event 304B in stream 404B to create the final derived event can be pushed into the object 312 such that the object 312 includes the following data 308: S2, A21, A22, and A23 with some key identifier. The presence of S2 can indicate that stream 404B has arrived and updated into the object 312.
2. The merger application 310 can analyze the event 304B from stream 404B to check if the object 312 already has data 308 that includes S1 (e.g., check if stream 404A has arrived). The merger application can determine if the corresponding event 304A from stream 404A has arrived. If the value is not present in the object 312, the event 304B from stream 404B can be configured with the configured counter 426B and pushed to the recoil application 416.
3. When the event 304B from stream 404B is in the recoil application 416, the event 304A from stream 404A can arrive to be listened to by the merger application 310.
4. The merger application 310 can analyze the event 304A from stream 404A to check if all the data 308B from stream is are present (e.g., whether the object 312 has value S2). If the data 308B is present, then the object 312 can be complete. In that case, the merger application 310 can use the event 304A from stream 404A to update the value A11 and A12 to the current object 312. The current object value can be updated to S1, S2, A11, A112, A21, A22, A23, and O. O can represent that the output was already sent.

5. Once the object 312 is complete, the merger application 310 can create a new derived event can be created and sent via the output stream 314.
6. After some time the event 304B from stream 404B can arrive from the recoil application to the merger application 310. The merger application can check if the object is complete or not. If the object 312 is complete and the output is sent, the event 304B from stream 404B can be dropped.
7. The recoil application 416 can maintain the object 312 for some time if the values or data 308 are needed across the different streams 404. Maintaining the object 312 can help propagate values to different streams.

In example scenario 2, the merger application 310 can create derived events from events 304 arriving from two streams such as stream 404A and stream 404B. One of the streams 404 can be late and fail to arrive within the configured interval. For example, stream 404B arrives at t1 and stream 404A does not arrive within the configured threshold (e.g., t1+δ>(retryCount*retryThreshold)).

The flow for Scenario 2 is as follows:
1. Stream 404B can be listened to by the merger application 310. The merger application 310 can push data 308B from stream 404B into the object 312 to create the final derived event. The data 308 included in the object 312 can be S2, A21, A22, and A23 with some key identifier. The presence of S2 can represent that stream 404B has arrived and the same is updated in the object 312.
2. The merger application 310 can analyze event 304B from stream 404B to check if the object 312 already has data 308A of S1 (e.g., check if stream 404A has arrived). Checking the object 312 can help determine if the corresponding event 304A from stream 404A has arrived or not. If the value is not present in the object 312, the merger application 310 can configure the event 304B from stream 404B with the configured counter 426B, and push the configured event 304B to the recoil application 416.
3. After some configured time (e.g., retryThreshold) the retry streaming application 430 of the recoil application 416 can push the event 304B back to the merger application 310 via the retry stream 434. The event 304B from stream 404B can again be listened to by the merger application 310, which can check whether the object 312 is complete or not. In this example scenario 2, the object 312 would not be complete, the counter 426B would be reduced, and the event 304B would again be pushed to the recoil application 416 by the merger application 310. The cycle can continue until counter 426B is zero (e.g., satisfies the threshold). Once the counter 426B reaches zero, a new derived event can be created and sent via the output stream 314 with whatever data is included in the object 312. The object 312 can also be updated to indicate the corresponding event 304A did not arrive. The updated object 312 can include the following data 308: S2, A21, A22, A23, and O. The O can represent that the data 308 included in the object 312 was assigned to be sent to the downstream applications 408 via the output stream 314.
4. Later, an event 304A from stream 404A can arrive. The merger application 310 can identify that the data 308 included in the corresponding object 312 was already sent. The later processing can depend on the use case and the downstream processing. The merger application 310 can either drop the event 304A or create output with that event 304A with an update flag and send it to the downstream applications 408 via the output stream 314.
5. To get consistency without affecting the processing of downstream applications 408, the merger application 310 can modify the counter 426B and the recoil application 416 can modify the retry threshold. The counter 426B or retry threshold can be configured (e.g., adjusted higher) based on the use case to achieve more consistency without affecting the logic.

In example scenario 3, the present disclosures can manage multiple streams 404 that arrive in their configured interval. For example, the multiple streams can be three streams 404 known as stream 404A, stream 404B, and stream 404C. The arrival order can be stream 404B, stream 404A, and stream 404C. To create the final derived event, the merger application 310 can consider three attributes—A21, A22, A23— from stream 404B, two attributes from stream 404A—A11, A12—and one attribute from stream 404C—A31).

The flow for Scenario 3 is as follows:
1. Stream 404B can be listened to by the merger application 310. All the data 308 needed from stream 404B in creating the final derived event can be pushed into the object 312. The data 308 included in the object 312 can be S2, A21, A22, and A23 with some key identifier. S2 can represent that stream 404B has arrived.
2. The merger application 310 can analyze the event 304B from stream 404B to check if the object 312 already includes data 308 of S1 and S3. In particular, the merger application 310 can check if the object 312 has values from stream 404A and stream 404C. This would help in determining if the corresponding event 304A from stream 404A has arrived or not. If the values are not present in the object 312, the merger application 310 can configure the event 304B from stream 404B with the configured counter 426B, and push the configured event 304B to the recoil application 416.
3. At some time, stream 404A can arrive within the configured threshold to be read by the merger application 310. The object 312 can be updated with data 308 from event 304A of stream 404A. The updated object 312 can include the following data 308: S1, S2, A21, A22, A23, A11, and A12. The O can represent that the data 308 was assigned for transmission via the output stream 314.
4. Once the object 312 is updated, the merger application 310 can drop the event 304B from stream 404B. For example, the merger application 310 can drop the event 304B from stream 404B because one of the events 304 was already sent to the recoil application 416 (e.g., event 304B from stream 404B).
5. The merger application 310 can listen for the event 304B of the stream 404B. The merger application 310 can check whether the object 312 is complete. If the object 312 is not complete, then the merger application 310 can reduce the counter 426B by one and send the event 304B back to the recoil application 416. At some time, the event 304C of the stream 404C can arrive (within the threshold) and the merger application 310 can update the object 312 to include the data 308C of event 304C of stream 404C. The updated object 312 can include the following data 308: S3, S1, S2, A21, A22, A23, A11, A12, A31, and O. The O can represent that the data 308 is assigned for transmission to the downstream applications 408. The merger application 310 can check if the object 312 is complete. If the object 312 is complete, the merger application 310 can create a new derived event from the data 308 from the object 312 to send as output.

6. Whenever an event 304B from stream 404B subsequently arrives from the recoil application 416, the merger application 310 can identify that the object 312 is complete and that the data 308 included in the object 312 was sent. Therefore, the merger application 310 can drop the event 304B of stream 404B.

In example scenario 4, the merger application 310 can manage multiple streams 404 out of which some do not arrive. For example, the multiple streams can be three streams 404 known as stream 404A, stream 404B, and stream 404C. Stream 404A and stream 404B can arrive but stream 404C does not arrive.

The flow for Scenario 4 is as follows:

1. The merger application 310 can listen for stream 404B. The merger application 310 can push data 308B from event 304B of stream 404C into the object 312 to create the final derived event. The created object 312 can be S2, A21, A22, and A23 with some key identifier. S2 can represent that stream 404B has arrived.

2. The merger application 310 can analyze the event 304B from stream 404B to check if the object 312 already has data 308 that includes S1 and S3 (e.g., check if the object 312 has data 308 from stream 404A and stream 404C). The merger application 310 can use the analysis to determine if the corresponding event from stream 404A has arrived or not. If the data 308A of event 304A is not present in the object 312, the event 304B from stream 404B can be configured with the configured counter 426B and pushed to the recoil application 416.

3. In some time, stream 404A can arrive within the configured threshold and the merger application 310 can update the object 312 with data 308A from event 304A of stream 404A. The updated object 312 can include the following data 308: S1, S2, A21, A22, A23, A11, and A12. Once the object 312 is updated, the merger application 310 can drop the event 304A of stream 404A. The merger application 310 can drop the event 304A since one of the events 304 (e.g., event 304B) was already sent to the recoil application 416.

4. In the meantime, the merger application 310 can listen for an event 304B of stream 404B and check whether the object 312 is complete. In this scenario, since the object 312 is not complete, the counter 426B can be reduced by one and the event 304B can be sent back to the recoil application 416. The cycle can continue until the counter 426B is zero or otherwise satisfy the threshold. Once the counter 426B reaches zero, the merger application 310 can create a new derived event to send as output with whatever attributes are included in the object 312. The object 312 can also be updated to indicate that the data 308 was already sent. The current object 312 can be S1, S2, A21, A22, A23, A11, A12, O. The O can represent that data 308 was sent. The retry can help create output and emit events from attributes in the object 312 during which a few streams 404 have not yet arrived. This architecture can automatically take care of emitting events 304 out of objects 312 in case of the corresponding event 304 has not arrived without relying on periodic checks of the object 312 for achieving the same.

5. Later, an event 304C from stream 404C can arrive. The merger application 310 can identify that the data 308 included in the object 312 was already sent. The later processing depends on the use case and the processing by the downstream applications 408. The merger application 310 can either drop that event 304, or create output with that event 304 with an update flag 428 and send it to downstream applications 408.

6. The merger application 310 can adjust counter 426B and the retry threshold to get more eventual consistency without affecting the processing of downstream applications 408. The counter 426B and the retry threshold can be configured (e.g., adjusted higher) to achieve more consistency without affecting the logic for the network environment.

E. EXAMPLE EMBODIMENTS

The following examples pertain to further example embodiments, from which permutations and configurations will be apparent.

Example 1 includes a method. The method includes creating, by the one or more processors, responsive to processing a first event from a first stream, an object including first data from the first event for merging the first data with second data from a second event of a second stream. The method includes routing, by the one or more processors, the first event to a retry stream to reprocess the first event responsive to determining that the object does not include the second data from the second event and a number of times the first event has been routed to the retry stream does not satisfy a threshold. The method includes transmitting, by the one or more processors, i) the first data and the second data included in the object responsive to processing the second event to update the object to include the second data or ii) the first data included in the object responsive to determining that the object does not include the second data from the second event and the number of times the first event has been routed to the retry stream satisfies the threshold.

Example 2 includes the subject matter of Example 1, further comprising subscribing, by the one or more processors, to the first stream, the second stream, and the retry stream.

Example 3 includes the subject matter of any of Examples 1 and 2, further comprising determining, by the one or more processors, that the object does not include the second data and the number of times the first event has been routed to the retry stream does not satisfy the threshold. The method can further include updating, by the one or more processors, a count indicating the number of times the first event has been routed to the retry stream. Routing the first event can include passing, by the one or more processors, the first event to a message broker corresponding to the retry stream.

Example 4 includes the subject matter of any of Examples 1 through 3, wherein creating the object includes identifying, by the one or more processors, one or more attributes from the first event. Creating the object further includes storing, by the one or more processors, as the first data, the one or more attributes in the object.

Example 5 includes the subject matter of any of Examples 1 through 4, wherein creating the object for the first event includes creating the object for the first event responsive to determining that an identifier of the first event does not match an identifier of any object stored by the one or more processors.

Example 6 includes the subject matter of any of Examples 1 through 5, further comprising receiving, by the one or more processors, the second event from the second stream. The method can further include determining, by the one or more processors, an identifier from the second event. The method can further include determining, by the one or more processors, that the identifier from the second event matches an identifier of the object. The method can further include storing, by the one or more processors, as the second data, one or more attributes from the second event in the object.

Example 7 includes the subject matter of any of Examples 1 through 6, further comprising dropping, by the one or more processors, the first event responsive to transmitting either the first data stored in the object or the first data and the second data stored in the object.

Example 8 includes the subject matter of any of Examples 1 through 7, further comprising assigning a flag to the object indicating that the data is to be transmitted responsive to i) determining that the object does not include the second data and the number of times the first event has been routed to the retry stream satisfies the threshold or ii) determining that the object includes the second data.

Example 9 includes the subject matter of any of Examples 1 through 8, further comprising generating, by the one or more processors, responsive to determining that the object includes the second data, a third event comprising one or more attributes from the first event and the second event, and wherein transmitting the data comprises transmitting the third event. The method can further include generating, by the one or more processors, responsive to determining that the object does not include the second data and the number of times the first event was routed to the retry stream satisfies the threshold, a fourth event comprising one or more attributes from the first event. Transmitting the data included in the object can include transmitting the third event or the fourth event.

Example 10 includes the subject matter of any of Examples 1 through 9, further comprising updating, by the one or more processors, responsive to creating the object including the first data of the first event, the object with a first flag indicating that the first event from the first stream has been received. The method can further include updating, by the one or more processors, responsive to updating the object to include the second data of the second event, the object with a second flag indicating that the second event from the second stream has been received.

Example 11 includes a system. The system includes one or more processors. The one or more processors are configured to create, responsive to receiving a first event from a first stream, an object including first data from the first event for merging the first data with second data from a second event of a second stream. The one or more processors are configured to route the first event to a retry stream to reprocess the first event responsive to determining that the object does not include the second data from the second event and a number of times the first event has been routed to the retry stream does not satisfy a threshold. The one or more processors are configured to transmit i) the first data and the second data included in the object responsive to processing the second event to update the object to include the second data or ii) the first data included in the object responsive to determining that the object does not include the second data from the second event and the number of times the first event has been routed to the retry stream satisfies the threshold.

Example 12 includes the subject matter of Example 11, wherein the one or more processors are further configured to determine that the object does not include the second data and the number of times the first event has been routed to the retry stream does not satisfy the threshold. The one or more processors can further be configured to update a count indicating the number of times the first event has been routed to the retry stream. To route the first event, the one or more processors can further be configured to pass the first event to a message broker corresponding to the retry stream.

Example 13 includes the subject matter of any of Examples 11 and 12, wherein to create the object, the one or more processors can further be configured to identify one or more attributes from the first event. The one or more processors can further be configured to store, as the first data, the one or more attributes in the object.

Example 14 includes the subject matter of any of Examples 11 through 13, wherein to create the object for the first event, the one or more processors can further be configured to create the object for the first event responsive to determining that an identifier of the first event does not match an identifier of any object stored by the one or more processors.

Example 15 includes the subject matter of any of Examples 11 through 14, wherein the one or more processors are further configured to receive the second event from the second stream. The one or more processors can further be configured to determine an identifier from the second event. The one or more processors can further be configured to determine that the identifier from the second event matches an identifier of the object. The one or more processors can further be configured to store, as the second data, one or more attributes from the second event in the object.

Example 16 includes the subject matter of any of Examples 11 through 15, wherein the one or more processors are further configured to drop the first event responsive to transmitting either the first data stored in the object or the first data and the second data stored in the object.

Example 17 includes the subject matter of any of Examples 11 through 16, wherein the one or more processors are further configured to assign a flag to the object indicating that the data included in the object is to be transmitted responsive to i) determining that the object does not include the second data and the number of times the first event has been routed to the retry stream satisfies the threshold or ii) determining that the object includes the second data.

Example 18 includes the subject matter of any of Examples 11 through 17, wherein the one or more processors are further configured to generate, responsive to determining that the object includes the second data, a third event comprising one or more attributes from the first event and the second event, and wherein transmitting the data comprises transmitting the third event. The one or more processors can further be configured to generate, responsive to determining that the object does not include the second data and the number of times the first event was routed to the retry stream satisfies the threshold, a fourth event comprising one or more attributes from the first event. To transmit the data included in the object, the one or more processors can further be configured to transmit the third event or the fourth event.

Example 19 includes the subject matter of any of Examples 11 through 18, wherein the one or more processors are further configured to update, responsive to creating the object using attributes of the first event, the object with a first flag indicating that the first event from the first stream has been received. The one or more processors can further be configured to update, responsive to updating the object using attributes of the second event, the object with a second flag indicating that the second event from the retry stream has been received.

Example 20 includes a non-transitory computer readable medium storing program instructions that, when executed by one or more processors, cause the one or more processors to create, responsive to receiving a first event from a first stream, an object including first data from the first event for merging the first data with second data from a second event of a second stream. The computer-readable medium further stores instructions that cause the one or more processors to route the first event to a retry stream to reprocess the first event responsive to determining that the object does not include the second data from the second event and a number of times the first event has been routed to the retry stream does not satisfy a threshold. The computer-readable medium further stores instructions that cause the one or more processors to transmit i) the first data and the second data included in the object responsive to processing the second event to update the object to include the second data or ii) the first data included in the object responsive to determining that the object does not include the second data from the second event and the number of times the first event has been routed to the retry stream satisfies the threshold.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided either on a standalone machine or, in some embodiments, on multiple machines in a distributed system. The systems and methods described above may be implemented as a method, apparatus, or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, and computer-readable non-volatile storage units (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer-readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   creating, by one or more processors, responsive to processing a first event from a first stream of a plurality of streams, an object including first data from the first event for merging the first data with second data from a second event of a second stream of the plurality of streams;
   routing, by the one or more processors, the first event to a retry stream to reprocess the first event responsive to determining that the object does not include the second data from the second event and a number of times the first event has been routed to the retry stream does not satisfy a threshold; and
   transmitting, by the one or more processors, i) the first data and the second data included in the object responsive to processing the second event to update the object to include the second data or ii) the first data included in the object responsive to determining that the object does not include the second data from the second event and the number of times the first event has been routed to the retry stream satisfies the threshold.

2. The method of claim 1, further comprising subscribing, by the one or more processors, to the first stream, the second stream, and the retry stream.

3. The method of claim 1, further comprising:
   determining, by the one or more processors, that the object does not include the second data and the number of times the first event has been routed to the retry stream does not satisfy the threshold;
   updating, by the one or more processors, a count indicating the number of times the first event has been routed to the retry stream; and
   wherein routing the first event comprises passing, by the one or more processors, the first event to a message broker corresponding to the retry stream.

4. The method of claim 1, wherein creating the object comprises:
   identifying, by the one or more processors, one or more attributes from the first event; and
   storing, by the one or more processors, as the first data, the one or more attributes in the object.

5. The method of claim 4, wherein creating the object for the first event comprises creating the object for the first event responsive to determining that an identifier of the first event does not match an identifier of any object stored by the one or more processors.

6. The method of claim 1, further comprising:
   receiving, by the one or more processors, the second event from the second stream;
   determining, by the one or more processors, an identifier from the second event;
   determining, by the one or more processors, that the identifier from the second event matches an identifier of the object; and
   storing, by the one or more processors, as the second data, one or more attributes from the second event in the object.

7. The method of claim 6, further comprising dropping, by the one or more processors, the first event responsive to transmitting either the first data stored in the object or the first data and the second data stored in the object.

8. The method of claim 1, further comprising assigning a flag to the object indicating that the data is to be transmitted responsive to i) determining that the object does not include the second data and the number of times the first event has been routed to the retry stream satisfies the threshold or ii) determining that the object includes the second data.

9. The method of claim 1, further comprising:
generating, by the one or more processors, responsive to determining that the object includes the second data, a third event comprising one or more attributes from the first event and the second event, and wherein transmitting the data comprises transmitting the third event; or
generating, by the one or more processors, responsive to determining that the object does not include the second data and the number of times the first event was routed to the retry stream satisfies the threshold, a fourth event comprising one or more attributes from the first event; and
wherein transmitting the data included in the object comprises transmitting the third event or the fourth event.

10. The method of claim 1, further comprising:
updating, by the one or more processors, responsive to creating the object including the first data of the first event, the object with a first flag indicating that the first event from the first stream has been received; and
updating, by the one or more processors, responsive to updating the object to include the second data of the second event, the object with a second flag indicating that the second event from the second stream has been received.

11. A system comprising:
one or more processors configured to:
create, responsive to receiving a first event from a first stream of a plurality of streams, an object including first data from the first event for merging the first data with second data from a second event of a second stream of the plurality of streams;
route the first event to a retry stream to reprocess the first event responsive to determining that the object does not include the second data from the second event and a number of times the first event has been routed to the retry stream does not satisfy a threshold; and
transmit i) the first data and the second data included in the object responsive to processing the second event to update the object to include the second data or ii) the first data included in the object responsive to determining that the object does not include the second data from the second event and the number of times the first event has been routed to the retry stream satisfies the threshold.

12. The system of claim 11, wherein the one or more processors are further configured to:
determine that the object does not include the second data and the number of times the first event has been routed to the retry stream does not satisfy the threshold;
update a count indicating the number of times the first event has been routed to the retry stream; and
wherein to route the first event, the one or more processors are configured to pass the first event to a message broker corresponding to the retry stream.

13. The system of claim 11, wherein to create the object, the one or more processors are further configured to:
identify one or more attributes from the first event; and
store, as the first data, the one or more attributes in the object.

14. The system of claim 11, wherein to create the object for the first event, the one or more processors are configured to create the object for the first event responsive to determining that an identifier of the first event does not match an identifier of any object stored by the one or more processors.

15. The system of claim 11, wherein the one or more processors are further configured to:
receive the second event from the second stream;
determine an identifier from the second event;
determine that the identifier from the second event matches an identifier of the object; and
store, as the second data, one or more attributes from the second event in the object.

16. The system of claim 11, wherein the one or more processors are further configured to drop the first event responsive to transmitting either the first data stored in the object or the first data and the second data stored in the object.

17. The system of claim 11, wherein the one or more processors are further configured to assign a flag to the object indicating that the data included in the object is to be transmitted responsive to i) determining that the object does not include the second data and the number of times the first event has been routed to the retry stream satisfies the threshold or ii) determining that the object includes the second data.

18. The system of claim 11, wherein the one or more processors are further configured to:
generate, responsive to determining that the object includes the second data, a third event comprising one or more attributes from the first event and the second event, and wherein transmitting the data comprises transmitting the third event; or
generate, responsive to determining that the object does not include the second data and the number of times the first event was routed to the retry stream satisfies the threshold, a fourth event comprising one or more attributes from the first event; and
wherein to transmit the data included in the object, the one or more processors are further configured to transmit the third event or the fourth event.

19. The system of claim 11, wherein the one or more processors are further configured to:
update, responsive to creating the object using attributes of the first event, the object with a first flag indicating that the first event from the first stream has been received; and
update, responsive to updating the object using attributes of the second event, the object with a second flag indicating that the second event from the retry stream has been received.

20. A non-transitory computer-readable medium storing instructions that, when executed by one or more processors, cause the one or more processors to:
create, responsive to receiving a first event from a first stream of a plurality of streams, an object including first data from the first event for merging the first data with second data from a second event of a second stream of the plurality of streams;
route the first event to a retry stream to reprocess the first event responsive to determining that the object does not include the second data from the second event and a number of times the first event has been routed to the retry stream does not satisfy a threshold; and transmit i) the first data and the second data included in the object responsive to processing the second event to update the object to include the second data or ii) the first data included in the object responsive to determining that the object does not include the second data from the second event and the number of times the first event has been routed to the retry stream satisfies the threshold.

* * * * *